United States Patent
Kent et al.

(10) Patent No.: US 6,633,551 B1
(45) Date of Patent: Oct. 14, 2003

(54) HIGH-REL BEACON SIGNAL SEQUENCER

(75) Inventors: Edward Jay Kent, Cherry Hill, NJ (US); John Tanzini, Trenton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/408,982

(22) Filed: Sep. 29, 1999

(51) Int. Cl.⁷ .............................................. H04B 7/185
(52) U.S. Cl. ...................................... 370/316; 455/427
(58) Field of Search ................................. 370/316, 321, 370/350; 342/356, 359, 372; 455/12.1, 427

(56) References Cited

U.S. PATENT DOCUMENTS

| | | | | |
|---|---|---|---|---|
| 3,993,999 A | * | 11/1976 | Hemmi et al. ............... | 342/372 |
| 4,257,050 A | | 3/1981 | Ploussios .................... | 343/854 |
| 4,799,065 A | * | 1/1989 | Thompson ................... | 343/779 |
| 4,907,004 A | * | 3/1990 | Zacharatos et al. .......... | 342/373 |
| 4,931,802 A | | 6/1990 | Assal et al. .................. | 342/356 |
| 5,929,804 A | * | 7/1999 | Jones et al. .................. | 342/354 |
| 6,014,372 A | | 1/2000 | Kent et al. ................... | 370/316 |

* cited by examiner

*Primary Examiner*—Chau Nguyen
*Assistant Examiner*—Nhat Do
(74) *Attorney, Agent, or Firm*—Duane Morris LLP

(57) ABSTRACT

A communication spacecraft generates a plurality of spot beams having a given spatial relationship. Four beams of the plurality are used to maintain the antenna aligned with a ground station. The four beams are sequenced about the ground location, and the signal characteristics of each beam are used to maintain pointing. The sequencing requires continual switch operation, and failure to maintain antenna position, as might be occasioned by the failure of an element such as a switch or oscillator, is ameliorated by a redundant source of beacon signals, together with an arrangement which duplicates the beacon signal, and uses redundant switch cascades and combiners to perform the switching required for sequencing the beams.

7 Claims, 13 Drawing Sheets

ERROR VOLTAGE VS. θ

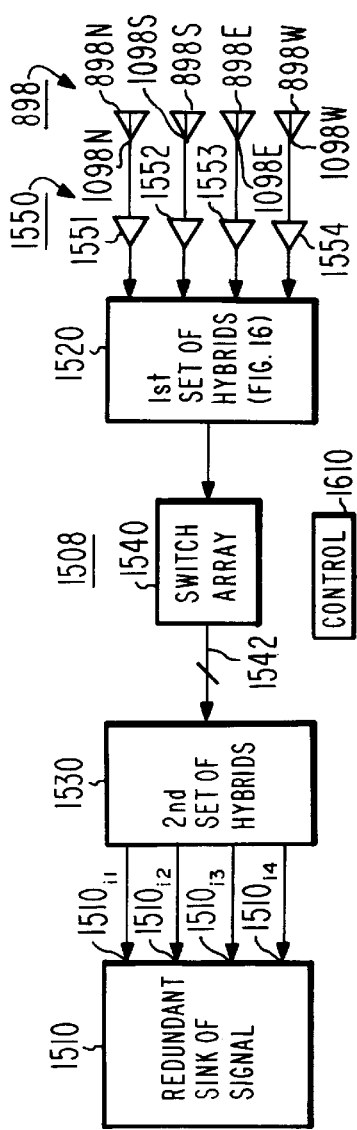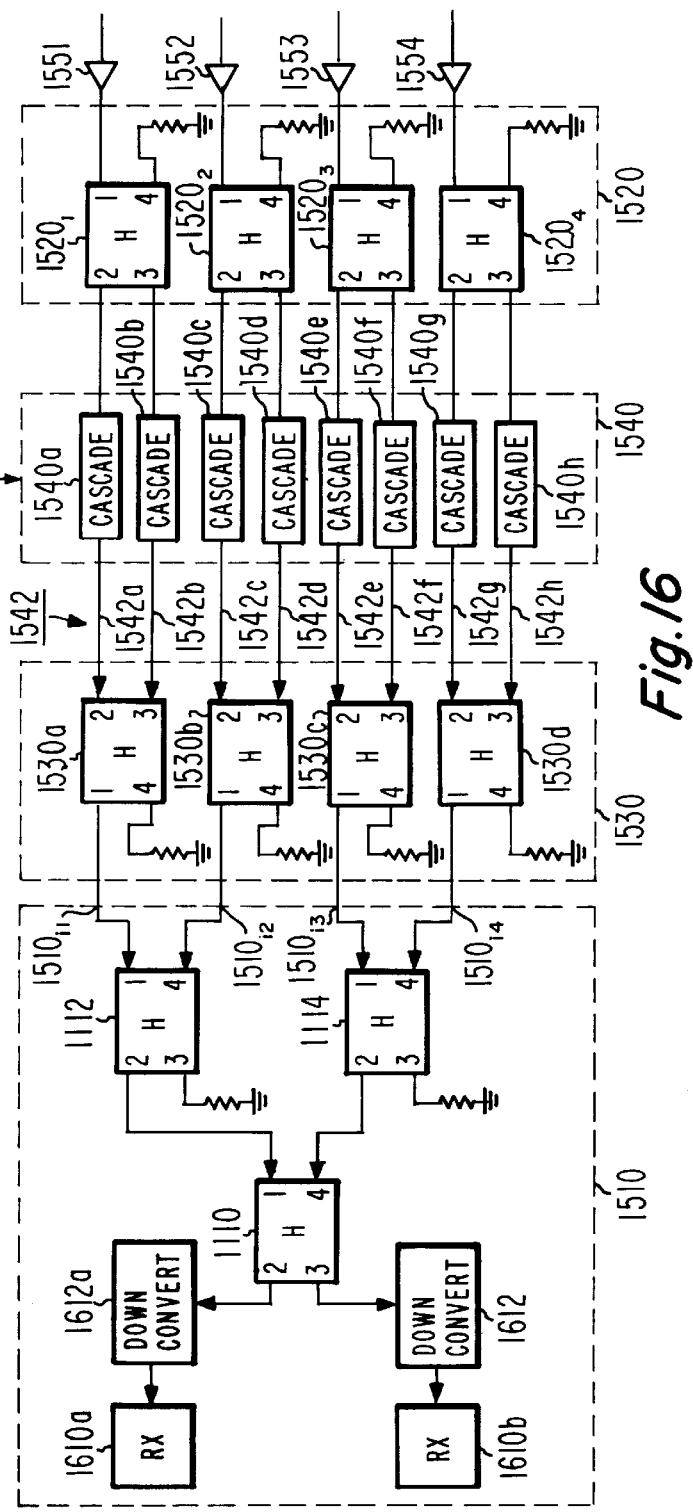
Fig.15
Fig.16

HIGH-REL BEACON SIGNAL SEQUENCER

FIELD OF THE INVENTION

This invention relates to a high-reliability spacecraft arrangement in which overlapping antenna beams are sequentially generated, as for control of the pointing of an antenna.

BACKGROUND OF THE INVENTION

This invention relates to spacecraft for cellular communications systems, and more particularly to such systems which provide coverage between terrestrial terminals in a region by way of a spacecraft, where some of the terrestrial terminals may be mobile terminals, and some may be gateways which link the cellular system with a terrestrial network such as a public switched telephone network (PSTN).

A salient feature of a spacecraft communication satellite is that all of the electromagnetic transmissions to the user terminals originate from one, or possibly a few, spacecraft. Consequently, the spacecraft communication antenna must form a plurality of beams, each of which is directed toward a different portion of the underlying target region, so as to divide the target area into cells. The cells defined by the beams will generally overlap, so that a user communication terminal may be located in one of the beams, or in the overlap region between two beams, in which case communication between the user communication terminal and the spacecraft is accomplished over one of the beams, generally that one of the beams which provides the greatest gain or signal power to the user terminal. Operation of spacecraft communication systems may be accomplished in many ways, among which is Time-Division Multiple Access, (TDMA), among which are those systems described, for example, in conjunction with U.S. Pat. Nos. 4,641,304, issued Feb. 3, 1987, and 4,688,213, issued Aug. 18, 1987, both in the name of Raychaudhuri. Spacecraft time-division multiple access (TDMA) communication systems are controlled by a controller which synchronizes the transmissions to account for propagation delay between the terrestrial terminals and the spacecraft, as is well known to those skilled in the art of time division multiple access systems. The TDMA control information, whether generated on the ground or at the spacecraft, is ultimately transmitted from the spacecraft to each of the user terminals. Consequently, some types of control signals must be transmitted continuously over each of the beams in order to reach all of the potential users of the system.

More specifically, since a terrestrial terminal may begin operation at any random moment, the control signals must be present at all times in order to allow the terrestrial terminal to begin its transmissions or reception (come into time and control synchronism with the communication system) with the least delay.

When the spacecraft is providing cellular service over a large land mass, many cellular beams may be required. In one embodiment, the number of separate spot beams is one hundred and forty. As mentioned above, each beam carries control signals. These signals include frequency and time information, broadcast messages, paging messages, and the like. Some of these control signals, such as synchronization signals, are a prerequisite for any other reception, and so may be considered to be most important. When the user communication terminal is synchronized, it is capable of receiving other signals, such as paging signals.

Communication spacecraft are ordinarily powered by electricity derived from solar panels. Because the spacecraft may occasionally go into eclipse, the spacecraft commonly includes rechargeable batteries and control arrangements for recharging the batteries when the power available from the solar panels exceeds the power consumed by the spacecraft payload. When a large number of cellular beams are produced by the antenna, a correspondingly large number of control signals must be transmitted from the spacecraft. When one hundred and forty beams are transmitted, one hundred and forty control signals must be transmitted. When the power available from the solar panels is divided between the information and data transmission channels of the spacecraft, the power available to the synchronization and paging signals may be at a level such that a user communication terminal in an open-air location may respond, but a similar terminal located in a building may not respond, due to attenuation of electromagnetic signals by the building.

FIG. 1 is a simplified block diagram of a spacecraft or satellite cellular communications system 10, as described in U.S. patent application Ser. No. 08/986,611, filed Dec. 8, 1997 in the name of Kent et al. In system 10, a spacecraft 12 includes a transmitter (TX) arrangement 12t, a receiver (RX) arrangement 12r, and a frequency-dependent channelizer 12c, which routes bands of frequencies from the receiver 12r to the transmitter 12t. Spacecraft 12 also includes an array of frequency converters 12cv, which convert each uplink frequency to an appropriate downlink frequency. Spacecraft 12 includes a power source which includes a solar panel (SP) illustrated as 12s, and a power converter (PC) or conditioner 12p for converting the solar array power into power suitable for powering the transmitter, receiver, and converters, and other devices on the spacecraft, such as, for example, attitude control systems. A transmitting antenna 12at mounted to the spacecraft body by a two-axis gimbal 12gt generates a plurality 20 of spot beams, one or more spot beams for each frequency band. Some of the spot beams 20a, 20b, and 20c of set 20 are illustrated by their outlines. Each antenna beam 20x (where x represents any subscript) defines a footprint on the surface 1 of the Earth below. The footprint associated with spot beam 20a is at the nadir 3 directly under the spacecraft, and is designated 20af. The footprint associated with spot beam 20c is designated 20cf, and is directed toward the horizon 5, while the footprint 20bf associated with spot beam 20b is on a location on surface 1 which lies between nadir 3 and horizon 5. It will be understood that those antenna beams which are illustrated in "lightning bolt" form also produce footprints. As is known to those skilled in the art, the footprints of antenna beams from a spacecraft may overlap (overlap not illustrated in FIG. 1), to provide continuous coverage of the terrestrial region served by the antennas. Spacecraft body 12b also carries, by way of a two-axis gimbal 12gr, a receiving antenna 12ar, which produces spot beams which are intended to be identical to those of transmitting antenna 12at.

Spacecraft 12 also includes a further transmit-receive antenna 72a, which produces a single, or possibly two or three, broad transmit beam(s) and corresponding receive beam(s), such as those designated as 20d and 20e, which are illustrated by "lightning bolt" symbols in order to simplify the drawing.

For completeness, it should be noted that each separate antenna beam forms an infinite number of more-or-less concentric "footprints" centered about the maximum-beam-intensity point on the ground, with each being a fraction of a decibel (dB) greater than the next inner footprint. When "a" footprint is discussed, a selected energy distribution across the "footprint" is assumed. Thus, a common assumption is that the beam intensity will not vary more than 3 dB across the footprint, which defines the extent of the footprint by the 3 dB contour of the antenna beam. Similarly, overlap of the beams is taken to mean overlap at the designated beam intensity. It should further be noted that a receiving antenna also preferentially receives signals within a receiving "beam," and for a given antenna, the receiving "beam" is "dimensionally" identical to the transmitting beam, in that it has the same beamwidth and gain.

As illustrated in FIG. 1, a group 16 of mobile terrestrial user terminals or stations includes three user terminals, denominated 16a, 16b, and 16c, each of which is illustrated as having an upstanding whip antenna 17a, 17b, and 17c, respectively. User terminal 16a lies on or within the footprint 20af, user terminal 16b lies within footprint 20bf, and user terminal 16c lies within footprint 20cf. User terminals 16a, 16b, and 16c provide communications service to users, as described below. Those skilled in the art will recognize that the illustration of a single user terminal in each footprint is only for ease of understanding, and that many such user terminals may be found in each footprint. More particularly, each illustrated user terminal 16a represents one of a plurality of user terminals which may be found within footprint 20af, and likewise illustrated user terminals 16b and 16c each represent one of a plurality of user terminals which may be found in footprints 20bf and 20cf, respectively.

FIG. 1 also illustrates a terrestrial gateway terminal (a fixed site, tower, or station) 14, which lies in a footprint (not designated) of the (or an) antenna beam 20e. While not illustrated, it should be understood that the footprint associated with beam 20e may also contain user terminals such as $16_x$. Gateway terminal 14 communicates with antenna 72a of spacecraft 12 by way of C-band electromagnetic signals transmitted from an antenna 14al, and receives C-band signals from the spacecraft by way of the same antenna. Gateway terminal 14 is coupled by a data path 9 with a land-line network or public switched telephone system (PSTN) illustrated as a block 8, and provides communication between spacecraft cellular communications system 10 and the PSTN 8. While a single gateway 14 is illustrated, the system 10 may contain many gateways at spaced-apart locations, to allow the spacecraft communication system to access different PSTNs. The signals traversing antenna beam 20e represent information signals from the user terminals 16 to the gateway terminal 14, and information signals from the gateway to various ones of the user terminals. The information signals are designated generally as COMM.

A network control center (NCC) 18 is illustrated in FIG. 1 as a terrestrial terminal lying in a footprint (not designated) of antenna beam 20d, originating from antenna 72a. The footprint may also contain user terminals (not illustrated). Network control center 18 includes an antenna 18a for communication with the spacecraft, and for communication by way of the spacecraft to the user terminals 16 and the gateway(s) 14. Network control center 18 also includes a GPS receiving antenna 18g for receiving global positioning time signals, to provide position information and an accurate time clock. Network control center 18 performs the synchronization and TDMA slot control which the spacecraft cellular communications network requires. The functions of network control center 18 may be distributed throughout the communication system 10, but unlike the arrangement of the land-based GPS cellular communication system, in which control of the slot timing is independently set at each cell center or tower, there is only one network control center associated with the spacecraft communication system 10, for the required control of the time-division multiple access slots cannot be applied simply to one cell or antenna beam, but rather must be applied across the entire system. While network control center 18 is illustrated in FIG. 1 as being separate from gateway 14, those skilled in the art will recognize that the network control center 18 includes functions, such as the antenna 18a, which are duplicated in the gateway 14, and that it may make economic sense to place the network control center 18, or the portions which together make up the network control center, at the site(s) of the gateway(s) such as gateway 14, so as to reduce the overall system cost by taking advantage of the redundancies to eliminate expensive subsystems.

The signals traversing antenna beam 20d between NCC 18 and spacecraft 12 of FIG. 1 represent control signals. "Forward" control signals proceed from the NCC 18 to the remainder of the communication system 10 by way of spacecraft 12, and "reverse" or "return" control signals are those which originate at terrestrial terminals other than the NCC, and which are sent to the NCC by way of the spacecraft. Forward control signals include, for example, commands from the NCC 18 to the various user terminals $16_x$, indicating which slot set is to be used by each user terminal for communication, while an example of a return control signal may be, for example, requests by various user terminals $16_x$ for access to the communication system 10. Other control signals are required, some of which are described in more detail below. As mentioned, those control signals flowing from NCC 18 to other portions of the communication system 18 are termed "forward" control signals, while those flowing in a retrograde direction, from the communication system 10 toward the NCC, are denominated "return" control signals.

The spacecraft 12 of FIG. 1 may need to produce many transmitted spot beams 20 from its antennas 12at and 12ar, and the transmissions over the spot beams may require substantial electrical power, at least in part because of the relatively low gain of the simple antennas 17 of the user terminals 16. In order to reduce the power required by the transmitters in the spacecraft, the largest number of downlink frequencies, namely those used for transmissions from the spacecraft to terrestrial user terminals, are desirably within a relatively low frequency band, to take advantage of increased component efficiencies (lower component losses) at the lower frequencies. The user terminals transmit to the spacecraft at the lower frequencies, for like reasons. The transmissions to and from the spacecraft from the NCC 18 and the gateway(s) 14 may be within a higher frequency band, in part because of FCC frequency allocation considerations, and in part to take advantage of high antenna gain available at the higher frequencies from large antennas at fixed installations, such as antennas 14al and 18a. In a specific embodiment, the uplinks and downlinks of the NCC and the gateways by way of antenna 72a may be at C-band (frequencies at about 3400 to 6700 MHz.), while the uplinks and downlinks of the user terminals by way of antennas 12at and 12ar are at L-band (frequencies at about 1500–1700 MHz). Thus, the downlink signals from transmit antenna 12at, by way of antenna beams 20a, 20b, and 20c of FIG. 1, are at frequencies within the relatively low L-band, while the uplink and downlink signals in antenna beams 20d and 20e of antenna 72a are at the higher C-band. The uplink signals from the terrestrial user terminals at L-band travel on receive spot beams (not illustrated in FIG. 1) of spacecraft receive antenna 12ar, which, at least in principle, correspond exactly with transmit beams 20a, 20b, and 20c. At the distances from the Earth's surface 1 at which geosynchronous spacecraft orbit, the distance between the transmit and receive antennas 12at and 12ar does not materially affect the beam correspondence, and even at low Earth orbit, is of almost no consequence.

FIG. 2 is similar to FIG. 1, except that, instead of illustrating the antenna beams $20_x$ (where the subscript x represents any one of the C- or L-band antenna beams) as a whole, some of the carriers contained in the beams are illustrated separately. For example, some of the forward control signals flowing from network control center 18 to C-band spacecraft antenna 72a over C-band antenna beam 20d are designated 105, 109, and 113, while some of the C-band return control signals flowing from antenna 72a of spacecraft 12 to the NCC 18 by way of antenna beam 20d are designated 106, 110, and 114. Each of these control signals is transmitted on a carrier of a different frequency, for reasons described below. Thus, the designations 105, 106, 109, 110, 113, and 114 in FIG. 2 may each be imagined to represent a different carrier frequency within C band. In practice in one embodiment, each of the forward control signals has a bandwidth of 200 KHz. As described below, each of the different uplinked control signal carriers will ultimately be routed to a different one of the L-band antenna downlink spot beams and its associated footprint; three footprints attributable to L-band downlinks are illustrated in FIGS. 1 and 2, so three uplinked forward control C-band signal carriers are illustrated, namely carriers 105, 109, and 113. Similarly, each of the different return control C-band signal carriers 106, 110, 114 downlinked from spacecraft 12 is generated by, or originates from, an L-band uplink from a user terminal 16 in a different one of the footprints illustrated in FIGS. 1 and 2; three footprints are illustrated, so the downlink portion of antenna beam 20e as illustrated includes the three carriers 106, 110, and 114.

As mentioned above in relation to the discussion of FIG. 1, the spacecraft 12 includes frequency-dependent channelizers 12c and frequency converters 12cv. The three forward control signals 105, 109, and 113 uplinked from NCC 18 of FIG. 2 to the spacecraft are received at antenna 72a of the spacecraft, and routed by way of receiver (RX) 12r to the channelizers 12c of the spacecraft, thence to an appropriate one of the frequency converters 12cv, where they are frequency converted to L-band. For example, uplinked forward control signal 105 of FIG. 2 arriving at antenna 12ar of the spacecraft over antenna beam 20d at C-band is converted from C-band to a frequency within L-band. In order to make it easy to track the flow of signals in FIG. 2, the L-band frequency corresponding to C-band frequency 105 is also designated 105. It is easy to keep the meaning of these identical designations in mind, by viewing them as identifying the control signals being transmitted; the forward control information on C-band uplink "frequency" 105 is retransmitted from the spacecraft, after frequency conversion to L-band, within antenna beam 20a produced by transmit antenna 12at, as downlink 105. Thus, the forward control signal information for all user terminals 16a lying within footprint 20af is uplinked from NCC 18 in C-band to the spacecraft over antenna beam 20d, and converted to an L-band downlink frequency 105 at the spacecraft, and transmitted in the L-band form over antenna beam 20a for use by all user terminals 16a within footprint 20af. Similarly, uplinked control signal 109 arriving at the spacecraft over antenna beam 20d at C-band is converted from C-band to a frequency within L-band. In order to make it easy to track the flow of signals, the L-band frequency corresponding to C-band frequency 109 is also designated 109. The control information on C-band uplink "frequency" 109 is retransmitted from the spacecraft on L-band, within antenna beam 20b, as downlink 109. Thus, the forward control signal information for all user terminals 16b lying within footprint 20bf is uplinked from NCC 18 in C-band to the spacecraft over antenna beam 20d, and converted to an L-band downlink frequency 109 at the spacecraft, and transmitted in the L-band form over antenna beam 20b for use by all user terminals 16b within footprint 20bf. For completeness, control signals generated at NCC 18 for ultimate transmission to user terminals 16c in footprint 20cf is generated at C-band at a frequency 113 different from frequencies 105 and 109, and is uplinked from NCC 18 to spacecraft 12. The C-band control signal 113 received at spacecraft 12 is frequency-converted to a frequency, designated as 113, in L-band, and transmitted over antenna beam 20c for use by all user terminals 16c lying in footprint 20cf.

It should be noted that the fact that forward control signals are transmitted on the same carriers to a group of user terminals 16 of FIG. 2 lying in a particular footprint does not necessarily mean that all the user terminals lying within that footprint must operate simultaneously or in the same manner; instead, within each control signal carrier, a plurality of TDMA slots are available, and each set of slots is capable of being directed or assigned to a different one of the user terminals within the footprint being controlled, so that the user terminals are individually controllable. Of course, simultaneous reception of broadcast forward control signals by all user terminals within a footprint is possible, and all user terminals receive information signals "simultaneously," in that they may all be receiving transmissions at the same "time" as measured on a gross scale, although each individual message is received in a different time slot allocation. It should also be noted that, while control signals have not been described as being transmitted over antenna beam 20e between spacecraft 12 and gateway 14, the gateway (and any other gateways throughout the system) also require such control signal transmissions. In the event that the NCC and a gateway are co-located, the control signals flowing therebetween may be connected directly, rather than by being routed through the spacecraft.

When a user terminal $16_x$ (where the subscript x represents any one of the user terminals) of FIG. 2 is initially turned on by a user, the user terminal will not initially have an assigned slot. In order to advise the NCC 18 that the user terminal is active and wishes to be assigned a slot by which it may communicate, the user terminal must first synchronize to the forward control signals, and then transmit a reverse control signal to the NCC 18 by way of spacecraft 12, requesting access in the form of assignment of an information carrier time slot. Thus, in addition to the forward control signals flowing from NCC 18 to the user terminals $16_x$, additional return control signals also flow from the user terminals to the NCC 18. These control signals originating from the user terminals lying within a particular footprint are modulated onto uplink carriers at L-band and transmitted to the spacecraft, where they are converted to frequencies lying in C-band for transmission to the NCC 18. More particularly, return control signals originating at user terminals 16a lying within footprint 20af are modulated onto an L-band uplink carrier frequency designated as 106 in FIG. 2. The return control signals are received by spacecraft antenna 12ar and receiver 12r by way of spot beam 20a, and routed by channelizer 12c to the appropriate frequency converter of converter array 12cv for conversion to C-band frequency 106. C-band frequency 106 is routed by way of a C-band transmitter (not illustrated) to C-band transmit-receive antenna 72a, for transmission over antenna beam 20d to NCC 18. Similarly, return control signals originating at user terminals 16b lying within footprint 20bf are modulated onto an L-band uplink carrier frequency designated as 110 in FIG. 2. The return control signals are received by spacecraft antenna 12ar in beam 20b, and routed by channelizer 12c to the appropriate frequency converter 12cv for conversion to C-band frequency 110. C-band frequency 110 is routed by way of antenna 72a, for transmission over antenna beam 20d to NCC 18. For completeness, return control signals from user terminals 16c in footprint 20cf are modulated onto an L-band uplink carrier frequency designated as 114, and are received by spacecraft antenna 12ar in beam 20c, routed to the appropriate frequency converter 12cv, converted to C-band frequency 114, and transmitted over antenna beam 20d to NCC 18. Thus, NCC 18 transmits a single forward control signal carrier to each downlink spot beam 20a, 20b, 20c, . . . on an L-band carrier at a frequency which identifies the downlink spot beam to which the forward control signal is directed. NCC 18 receives return control signals from the various user terminals in footprints associated with the spot beams, and one return carrier is associated with each spot beam. In each spot beam, user terminals receive forward control signals over a carrier in an L-band downlink, and transmit return control signals over an L-band uplink. Spot beam 20a is associated with forward and return control signal carriers 105 and 106, respectively, spot beam 20b is associated with forward and return control signal carriers 109 and 110, respectively, and beam 20c is associated with forward and return control signal carriers 113 and 114, respectively.

Only the control signal carriers have been so far described in the arrangement of FIG. 2. The whole point of the communication system 10 is to communicate information signals among the users, so each antenna beam also carries signal carriers on which information signals are modulated or multiplexed by FDMA/TDMA, under control of the NCC 18. It should first be noted that NCC 18 of FIG. 2 does not need any information signal carriers (unless, of course, it is associated with a gateway terminal as described above). In general, information signals flow between gateways and user terminals. More particularly, signals from public switched telephone system 8 of FIG. 2 which arrive over data path 9 at gateway terminal 14 must be transmitted to the designated user terminal $16_x$ or other gateway $14_x$, which is likely to be served by an antenna beam other than beam 20d which serves gateway 14. Gateway 14 must communicate the identity of the desired recipient by way of a return control signal to NCC 18, and receive instructions as to which uplink carrier is to be modulated with the data from PSTN 8, so that the data carrier, when frequency-converted by the frequency converters 12cv in spacecraft 12, is routed to that one of the antenna beams which serves the desired recipient of the information. Thus, when information is to be communicated from gateway 14 to the remainder of communication system 10, it is transmitted on a selected one of a plurality of C-band uplink carriers, where the plurality is equal to the number of spot beams to be served. In the simplified representation of FIG. 2, three spot beams 20a, 20b, and 20c are served in the system, so gateway 14 must produce information signal carriers at three separate C-band uplink frequencies. These three carrier frequencies are illustrated as 107, 111, and 115. The information signal is modulated onto the appropriate one of the carriers, for example onto carrier 107, and transmitted to the spacecraft 12. At the spacecraft, the C-band carrier 107 is converted to an L-band frequency carrier, also designated 107, which is downlinked over spot beam 20a to those user terminals (and gateways, if any) lying in footprint 20af. Within footprint 20af, that particular one of the user terminals 16 to which the information signal is destined, and which has been assigned a TDMA slot set, recovers that portion of the frequency carrier 107 associated with the TDMA slot set, and therefore recovers the information signal. Similarly, information modulated at gateway 14 onto C-band uplink carrier 111, and transmitted to the spacecraft, is converted to L-band carrier 111, and downlinked over spot beam 20b to user terminals lying in footprint 20bf. For completeness, information modulated at gateway 14 onto C-band uplink carrier 115, and transmitted to the spacecraft, is converted to L-band carrier 115, and downlinked over spot beam 20c to user terminals lying in footprint 20cf. Within each footprint, the various user terminals select the information signals directed or addressed to them by selecting the particular time slot set assigned by NCC 18 for that particular communication.

Each user terminal lying in a footprint (and gateway, if any) of system 10 of FIG. 2 must be able to transmit information to the spacecraft for reradiation to a desired recipient. In general, all user terminals communicate only with gateways. If a user terminal of the system wishes to communicate with another user terminal of the system, the information may be routed first to one of the gateways, and then from the gateway back to the intended recipient user terminal. In one mode of operation, however, the user terminals may communicate directly with other user terminals in other spot beams. Thus, any user terminal 16a lying in footprint 20af of FIG. 2 communicates its information signals by modulating them onto (a selected slot set of) an L-band carrier 108. The transmission is received by antenna 12ar of spacecraft 12, and the signal is routed by way of channelizers 12c to the appropriate frequency converter of converter array 12cv, where conversion to a C-band frequency takes place. For example, L-band uplink information signal carrier 108 received by the spacecraft in spot beam 20a is converted to a C-band carrier frequency also designated 108, which is downlinked over antenna beam 20e to gateway 14. Similarly, L-band uplink information signal carrier 112 received by the spacecraft in spot beam 20b is converted to a C-band carrier frequency also designated 112, which is downlinked over antenna beam 20e to gateway 14, and uplink signal carrier 116 of antenna beam 20c is converted to downlink carrier 116 of antenna beam 20e to gateway 14. The user terminals (and gateways) in each spot beam thus transmit their information signals on uplink carriers having frequencies selected so that, after frequency conversion and channelization at the spacecraft, the resulting downlink carriers travel the particular antenna beam which is directed toward the recipient gateway. Similarly, signals originating at a gateway are modulated onto carriers which, after frequency conversion and channelizing at the spacecraft, traverse that one of the spot beams associated with the footprint in which the designated recipient is located. It should be noted that part of the system control performed by the NCC 18 is to determine the spot-beam in which a designated mobile recipient is located by keeping a record of the last location of each identifiable user, so that each spot beam does not have to be individually polled each time a connection to a mobile user is requested, to "find" the desired mobile user.

FIG. 3 illustrates details of one embodiment of spacecraft 12. As illustrated in FIG. 1, the spacecraft 12 includes a body 12b, which supports two deployed solar panel arrays $12_{s1}$ and $12_{s2}$. The spacecraft body 12b also supports deployed transmit antenna 12at and receive antenna 12ar. As mentioned, antennas 12at and 12ar preferably each produce a plurality of relatively narrow spot radiation beams directed towards the surface of the Earth. In one embodiment, the spot beams 20a, 20b, and 20c are less than two degrees wide (as conventionally measured at their 3 dB points).

FIG. 3 also illustrates a C-band antenna 72a, adapted for transmitting and receiving signals at C-band. As described below, these signals are communicated between a gateway terminal, or other fixed terrestrial terminal, and antenna 72a, for the described purposes. The pattern of spot receiving beams produced by antenna 12ar is ideally identical to the spot transmitting beams produced by antenna 12at, so that the radiation beams are congruent. Those skilled in the art of antennas know that, even if antennas 12at and 12ar produce identical beam patterns, misalignment between the transmit and receive antennas may result in misalignment of at least some of the spot beams, as a result of which some terrestrial terminals $16_x$ lying within one spot transmit beam will lie within a receive beam which does not correspond to the transmit beam. Such misalignments may be due to (a) long-term or seasonal errors including thermal distortion, orbit and ephemeris uncertainty, (b) diurnal errors attributable to attitude control errors including gyro drift, (c) short-term errors due to reflector resonances and attitude control system error, and (d) residual errors. Errors may also be caused by antenna integration misalignments and/or incorrect deployment.

As illustrated in FIG. 3, transmit antenna 12at takes the form, when deployed, of a parabolic reflector 12atr and a feed array 12atf. Feed array 12atf is mounted on the spacecraft body at a location near the focus of the parabolic reflector. Similarly, receive antenna 12ar includes a deployed reflector 12arr in conjunction with a feed array 12arf. The feed arrays include an array of feed horns.

The gimbals 12gt and 12gr are mounted at the junctures of spacecraft body with reflector supports 12gts and 12gtr.

FIG. 4 illustrates the layout of the horn apertures of feed horn arrangement 12atf of FIG. 3. In FIG. 4, a map of a portion of Asia is superposed on some of the circles representing apertures, distorted to appear as it would from a spacecraft to the East of the Asian coast. More particularly, Asia, together with its principal islands is designated generally as 410, 412 represents India, 414 represents the combination of Vietnam, Cambodia, and Thailand, and 416 represents the island and mainland portions of Malaysia. Some of the islands of Indonesia are represented as 418. New Guinea is illustrated as 420, and Taiwan (Formosa) by 422. The Korean peninsula is 424, and the Japanese islands are represented as 426. The circles, some of which are designated 430, represent the apertures of the various feed horns of the feed array 12atf of transmit antenna 12at of FIG. 3. Not all of the feed horn apertures are illustrated, because there are eighty-eight feed horn apertures, and illustrating them all would make the illustration difficult to interpret. For the most part, the peripheral horns of the array have been illustrated, together with a line, which is illustrated by the arrows 432, of horns across the region being served. However, it will be understood that the entire continent of Asia, and its offshore islands out as far as the Philippines, are served by spot beams originating from the eighty-eight feed horn apertures which are illustrated, in part, in FIG. 4. More particularly, the feed horn array 12atf of FIGS. 1, 2, and 3 may be represented by the outline of FIG. 4, completely filled in by circles. The exact arrangement of the horn apertures is not particularly material, and the appropriate arrangement for use with a parabolic reflector will be readily understood to those skilled in the antenna arts. It should be noted that the circles of FIG. 4 do not represent the spot beam footprints themselves, but may roughly be conceived of as being a version of the footprints which each horn itself would form if it were energized independently, without a beamformer.

FIG. 5 illustrates a beamformer arrangement 500 which is used in conjunction with transmitting antenna 12at, to allow A feed horns (where A is eighty-eight in the example) to produce a total of N spot antenna beams, where N is 140 in the example. In short, the beamformer combines the signals associated with, or "from" each feed horn with the signals from adjacent ones of the feed horns, in such a manner as to produce the desired beams. The beamformer 500 of FIG. 5 includes an "input" port (considering the antenna in its transmitting mode) for each of the N beams to be generated from the antenna; the input ports are then $510_{B1}, 510_{B2}, \ldots, 510_{BN}$, where N represents the total number of beams to be generated, namely 140 beams in the example. The ports $510_{B1}, 510_{B2}, \ldots, 510_{BN}$ are coupled to an RF power divider network designated generally as 520. Network 520 includes a plurality N of individual beam power divider networks $520_{D1}, 520_{D2}, \ldots, 520_{DN}$, each of which transforms a single one of the signals applied to a port $510_{B1}, 510_{B2}, \ldots,$ or $510_{BN}$ into J output signals, each having a specified amplitude weighting and phase weighting, all as known in the art, which J output signals, when applied to a like number J of antenna radiating elements, produce a beam in space. The power division for weighting is typically accomplished by junctions of several transmission-line sections having various selected relative impedances, or by couplers formed by transmission lines spaced from each other by specific distances over specific lengths. Phase weighting is ordinarily accomplished by selecting among various physical lengths of transmission line, which inherently have different electrical lengths. The outputs of each of the power dividers $520_{D1}, 520_{D2}, \ldots, 520_{DN}$ of set 520 are coupled to input ports of a plurality of power combiners $532_{C1}, 530_{C2}, \ldots, 530_{CA}$, where A is the number of separate radiating elements of the array which are to be involved in the generation of each beam. Each power combiner $530_{C1}, 530_{C2}, \ldots, 530_{CA}$ of set 530 combines the signals from K of the power dividers, and couples the powers so combined to the associated one of the A antenna elements.

Those skilled in the art know that the term "RF" when used in this context means "radio-frequency," and that the term originally had a meaning which limited the range of frequencies to the range of 550 to 1600 KHz. The term is now very broadly used to refer to any frequency range extending from audio frequencies (up to around 20 KHz) to frequencies just below infrared frequencies.

The transmit antenna 12at of FIG. 1 is aligned by use of a fixed ground station located in a region lying between adjacent ones of the spot beams. The spacecraft transmits a beacon signal over the beams, and the beacon signals on the beams are received by the fixed site. One or more characteristics of the multiple beacon signals received over the various beams are processed to determine the deviation of the spacecraft antenna from its proper position. A control signal is generated from the deviation information, which ultimately restores the transmit antenna to its proper position. More particularly, if the fixed ground station is located at a position which is ideally half-way between two adjacent spot beams, one of which is east, and one west of the location, a signal transmitted by way of both beams with equal amplitude should be received at the fixed site with equal amplitudes if the antenna in question is properly aligned. A deviation in amplitude is indicative of an error in positioning.

FIG. 6 illustrates a portion of the region of Asia previously illustrated in FIG. 4, showing four spot beam footprints designated N, S, E, and W, which are made larger than their actual dimensions for ease of representation. The four footprints overlap at a dot which represents Batam, at which a fixed terrestrial Beacon Reference Terminal (BRT) site will be used to receive the beacon signals, for adjusting the position of the transmit antenna 12*at* in a manner which aligns it with the underlying surface. The receive antenna 12*ar* is aligned in a similar manner, so that both the transmit antenna 12*at* and the receive antenna 12*ar* are aligned with a feature of the target surface, and therefore with each other.

FIG. 7a illustrates two adjacent antenna beams $V_N$ and $V_S$, which overlap symmetrically about a solid vertical line at an angle designated $2_0$, which represents a symmetrical a overlap of the beams at 2=0E. If a misalignment occurs, so that the fixed terrestrial terminal is located at an error angle $2_K$, a difference results between the signals received on or from the two antenna beams $V_N$ and $V_S$, in an amount $V_N-V_S$. FIG. 7b is a plot of an error voltage which results from processing the difference signal $V_N-V_S$ by normalization, $(V_N-V_S)/(V_N+V_S)$, showing how a misalignment results in a linear change of the error signal relative to angular displacement.

FIG. 8 is a simplified block diagram of an antenna alignment control system as described in the abovementioned Kent et al. application. In FIG. 8, a Frequency Generation unit (FGU) 810 generates a baseband beacon signal, which is applied to an upconverter 812. A portion 818 of beamforming network 500 is associated with the beacon signal, while the remaining portion of beamformer 500, and its input ports 510, are associated with the communications beams of the communications system. The upconverted beacon signal is applied to a clocked one-of-four switch 816, which sequentially applies the upconverted beacon signal to input ports 818N, 818S, 818E, and 818W of the beamformer portion 818, corresponding to the N, S, E, and W beams illustrated in FIG. 7a. The beacon signal is transmitted in time sequence from the ports 819N, 819S, 819E, and 819W (although not necessarily in the stated order) to the antenna elements 898N, 898S, 898E, and 898W of feed array 12*atf* of transmit antenna 12*t*, for generation of (or transmission over) the N, S, E, and W beams. The beacon signals are received in time sequence at L-band antenna 14*a2* at the fixed terrestrial Beacon Reference Terminal (BRT) 14$_{BRT}$. The received beacon signals are applied from BRT 14$_{BRT}$ to a clocked error signal generator 820, which removes or demodulates the time sequence using a switch arrangement T1, T2, T3, T4 synchronized to the corresponding switches of beam selection switch 816, and temporarily stores the resulting four signals in stores (not illustrated). The four stored signals represent the beacon signals $V_N$, $V_S$, $V_W$, and $V_E$ received by BRT receiver 14$_{BRT}$ from each of the N, S, E, and W beams. The $V_N$ and $V_S$ signals are applied to a subtractor 821 to produce signals representative of $V_N-V_S$, and the $V_N$ and $V_S$ signals are applied to an adder 822 to produce a signal representative of $V_N+V_S$. Similarly, the $V_W$ and $V_E$ signals are applied to a subtractor 823 to produce signals representative of $V_E-V_W$, and the $V_W$ and $V_E$ signals are applied to an adder 824 to produce a signal representative of $V_E+V_W$. The $V_N-V_S$, and $V_N+V_S$ signals are applied to a divider 826 to produce a normalized error signal $V_{error\ NS}$ $$V_{error\ NS}=(V_N-V_S)/(V_N+V_S)$$

to determine the north-south error. The $V_W-V_E$, and $V_W+V_E$ signals are applied to a divider 828, to produce a signal representing an EW error signal $V_{error\ EW}$ $$V_{error\ EW}=(V_E-V_W)/(V_E+V_W)$$

The NS and EW error signals are applied by way of first and second signal paths to a computer 840. The first signal path includes a buffer 831, an analog-to-digital converter (ADC) 832, and an error processor (E-P) 833, and the second signal path includes a buffer 834, ADC 835, and E-P 836. Computer 840 converts the error value to signals which can be transmitted by antenna 14*al* over a C-band uplink 850 to C-band antenna 72*a* of the spacecraft 12, for two-axis control of the gimbal 12*gt* by which the transmit antenna 12*at* is supported. The arrangement of FIG. 8 controls the gimbal 12*gt* in the NS and EW planes under control of the two error signals in a manner which maintains the four N, S, E, and W antenna beams centered about the Batam BRT. It should be noted that, in the arrangement of FIG. 8, the processing by taking differences and dividing which is performed in blocks 821, 822, 823, 824, 826, and 828 is illustrated as being performed by analog processing blocks, which might be at RF frequencies, or it might be at intermediate frequencies, if an appropriate frequency converter were used in BRT receiver 14$_{BRT}$. As an alternative, the BRT receiver 14$_{BRT}$ may perform analog-to-digital conversion, so that all the processing performed in block 820 is performed by a digital processor (or a portion of a digital processor), thereby eliminating the need for analog-to-digital converters 832 and 834.

FIG. 9 is a simplified block diagram which illustrates a corresponding control arrangement for receive antenna 12*ar* of FIGS. 1, 2, and 3. The system of FIG. 9 operates in the same fundamental manner as the arrangement of FIG. 8, but is arranged so that the receiving antenna 12*ar* is required only to receive, rather than transmit. In FIG. 9, elements corresponding to those of FIG. 8 are designated by like reference numerals. In FIG. 9, a baseband beacon signal is generated by a frequency generator unit (FGU) 910, and is upconverted to L-band by a frequency converter 912. The up-converted signal is transmitted from antenna 14*a2* toward spacecraft 12. In addition to the other functions performed by the receiving antenna 12*ar* of spacecraft 12, it produces four beams which are centered about the BRT 14 location. These beams are available at ports 918N, 918S, 918E, and 918W of the beamforming network (BFN) 918. The beacon signal appears simultaneously at beamformer ports 918N, 918S, 918E, and 918W, and the signals are applied from the beamformer ports to switches T1, T2, T3, and T4 of commutating switch 916. The four switches T1, T2, T3, and T4 are closed (contact is made) in time sequence under the control of clock 917, so that the four received beacon signals appear in time sequence at output port 916*o* of commutating switch 816. The commutated beacon signal is coupled from output port 916*o* to a downconverter 914, where the beacon signal is converted to baseband, but has the modulation of the antenna beam switching.

The downconverted, commutated beacon signal needs to be relayed to the ground, where the error is processed. In order to accomplish the relaying of the downconverted, commutated beacon signal to the ground without using additional dedicated beacon tracking equipment, such as an on-board receiver and processor, the downconverted, commutated beacon signal is converted by downconverter 914 of FIG. 9 to C-band (in one embodiment), and applied from downconverter 914 to a C-band transponder 924, otherwise necessary in the spacecraft for transmission of the C-band information signals., which converts the commutated baseband beacon signal to C-band, for transmission by way of a transmit-receive device 950 to antenna 72a for transmission to gateway ground station 14. The C-band signal from antenna 72a traverses the downlink to antenna 960 and is coupled by a transmit-receive device 961 to a C-band receiver 962. Receiver 962 demodulates the commutated beacon signal, and makes it available to a further synchronized commutator and processor 820, which is identical in principle to element 820 of FIG. 8. Synchronized commutator and processor 820 of FIG. 9 generates error signals in the same manner as that described in conjunction with FIG. 8, and couples the error signals by way of buffers 831 and 834, ADCs 832 and 835, and error processors 833 and 836 to computer 840. It will be recognized that the structure extending from block 820 to block 840 of FIG. 9 is identical to the similar structure of FIG. 8, and operates in the same manner to produce correction signals at the output of computer 840. The correction signals are coupled from computer 840 of FIG. 9 to transmit-receive device 961, and are coupled by way of antenna 960 and an uplink path to antenna 72a. From antenna 72a, transmit-receive device 950 directs the correction signals to gimbal 12gr, for correcting the position of receive antenna 12ar. Thus, the commutated beacon signal is transmitted from the spacecraft to the ground station at C-band, and the beacon signal is extracted at the ground station and processed as in FIG. 8. This technique avoids burdening the spacecraft with dedicated equipment used only by the beacon.

SUMMARY OF THE INVENTION

An electromagnetic beam selection arrangement according to an aspect of the invention includes a first plurality of beamforming antenna elements, each having a port. Each of these beamforming elements may be a single radiating element of an array, or each may be a subarray of radiating elements. The arrangement includes a first set of hybrids including a plurality, equal to the first plurality, of three-dB hybrids. Each of the three-dB hybrids includes at least first, second, third, and fourth ports, and each of the three-dB hybrids provides transmission between the first port and the second and third ports with a relative amplitude of −3 dB and with quadrature phase between the signal appearing at the second and third ports (so long as the fourth port is terminated in the appropriate impedance). The first ports of each of the three-dB hybrids of the first set of three-dB hybrids is coupled by way of amplifiers to the ports of the beamforming elements, and the fourth ports of the hybrids of the first set are terminated in the appropriate impedance. The arrangement also includes a second set of three-dB hybrids. The second set includes a plurality, equal to the first plurality, of three-dB hybrids. Each of the three-dB hybrids of the second plurality is electrically identical to a three-dB hybrid of the first set. The fourth ports of each of the three-dB hybrids of the second set are terminated in the appropriate impedance. A redundant one of a source and sink of signal is also provided in the arrangement. The redundant source or redundant sink includes a plurality of ports, where the plurality is equal to the first plurality. Each of the ports of the redundant source of signal or redundant sink of signal is coupled to a first port of one of the hybrids of the second set of hybrids, and not to the ports of others of the hybrids of the second set of hybrids. A set of solid-state RF switch cascades is also provided. Each of the switch cascades includes a cascade of at least two solid-state switches, and each of the cascades of switches is electrically coupled between one of (a) a second port of a hybrid of the first set of hybrids and a second port of a corresponding hybrid of the second set of hybrids and (b) a third port of a hybrid of the first set of hybrids and a third port of a corresponding hybrid of the second set of hybrids. As a result of these connections, or whereby, a pair of the cascades connects each three-dB hybrid of the first set of hybrids to a corresponding one of the three-dB hybrids of the second set of hybrids. The arrangement also includes a controller coupled to the switches of the set of solid-state switch cascades. A controller is coupled to the switches of the set of solid-state switch cascades, for controlling the switches to accomplish two functions, (a) and (b). The first or (a) function is to operate at least some of the switches of each cascade always to the same state, as for example by operating all serially coupled switches of a cascade ON or OFF together. If there are interleaved series and parallel switches, for any particular coupling condition of the cascade, each of the series switches would be set to conduct, and the parallel switches to not conduct, or vice versa. The second or (b) function is to operate the switches of the pair-sets of cascades so as to cycle coupling among sets of cascades, so that the beacon signal is sequenced to the beamforming antenna elements. More particularly, the (b) function is to operate the switches of at least one cascade, of that particular pair of cascades which couple together a selected hybrid of the first set of hybrids with a corresponding hybrid of the second set of hybrids, to a state which provides coupling between the selected hybrid and the corresponding hybrid by way of the at least one cascade of the selected pair of cascades. At the same time, or simultaneously, at least some of the switches of those pairs of cascades which couple together non-selected ones of the first set of hybrids with corresponding ones of the hybrids of the second set of hybrids are controlled or operated to states which provide reduced coupling. The second or (b) function further includes the sequential selection, in turn, of each of the hybrids of the first set of hybrids. As a result of this control function applied to the structure, each of the beamforming antenna elements is sequentially selected and is coupled by at least one switch path of redundant switch paths to the redundant one of the source and sink.

In another embodiment of the invention, the controller controls the switches for (a) operating the switches of each cascade always to the same state, and (b) closing the switches of that pair of cascades which couple together a selected hybrid of the first set of hybrids with a corresponding hybrid of the second set of hybrids while, or simultaneously with, opening the switches of those pairs of cascades which couple together non-selected ones of the first set of hybrids with corresponding ones of the hybrids of the second set of hybrids. The controller also controls the switches for sequentially selecting, in turn, each of the hybrids of the first set of hybrids, whereby each of the beamforming antenna elements is sequentially selected and is coupled by redundant switch paths to the redundant one of the source and sink. In a particularly advantageous embodiment of the invention, the plurality is four.

BRIEF DESCRIPTION OF THE DRAWING

FIG. 15 is a simplified block diagram of a portion of an apparatus according to an aspect of the invention, for sequentially generating a plurality of partially-overlapping beams from a receive antenna; and FIG. 16 is a simplified block diagram of a portion of the arrangement of FIG. 15.

DESCRIPTION OF THE INVENTION

Figure 1:
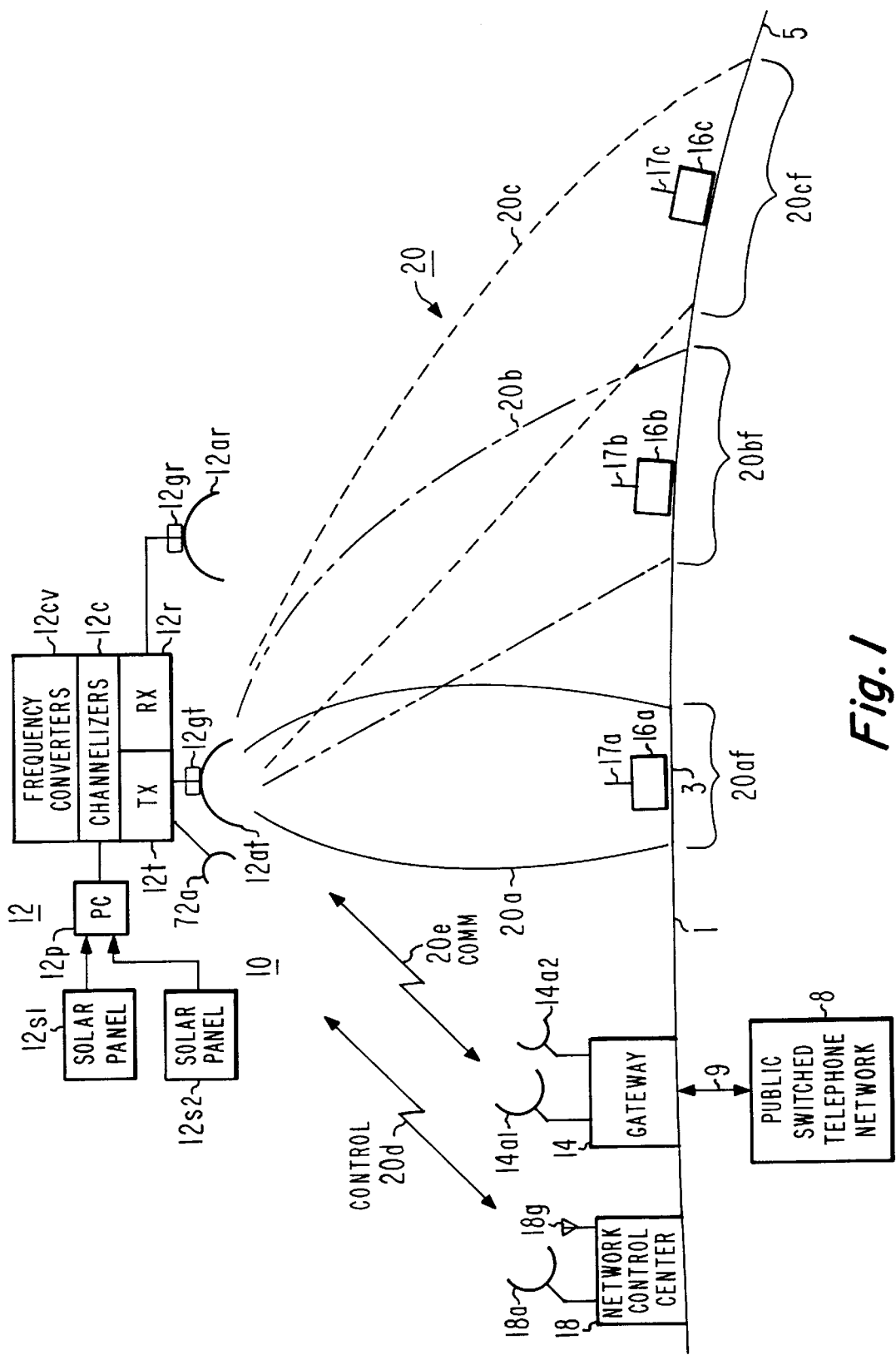
FIG. 1 is a simplified diagram of a spacecraft cellular communications system as described in a copending patent application, illustrating some antenna beams which define system cells.
Figure 2:
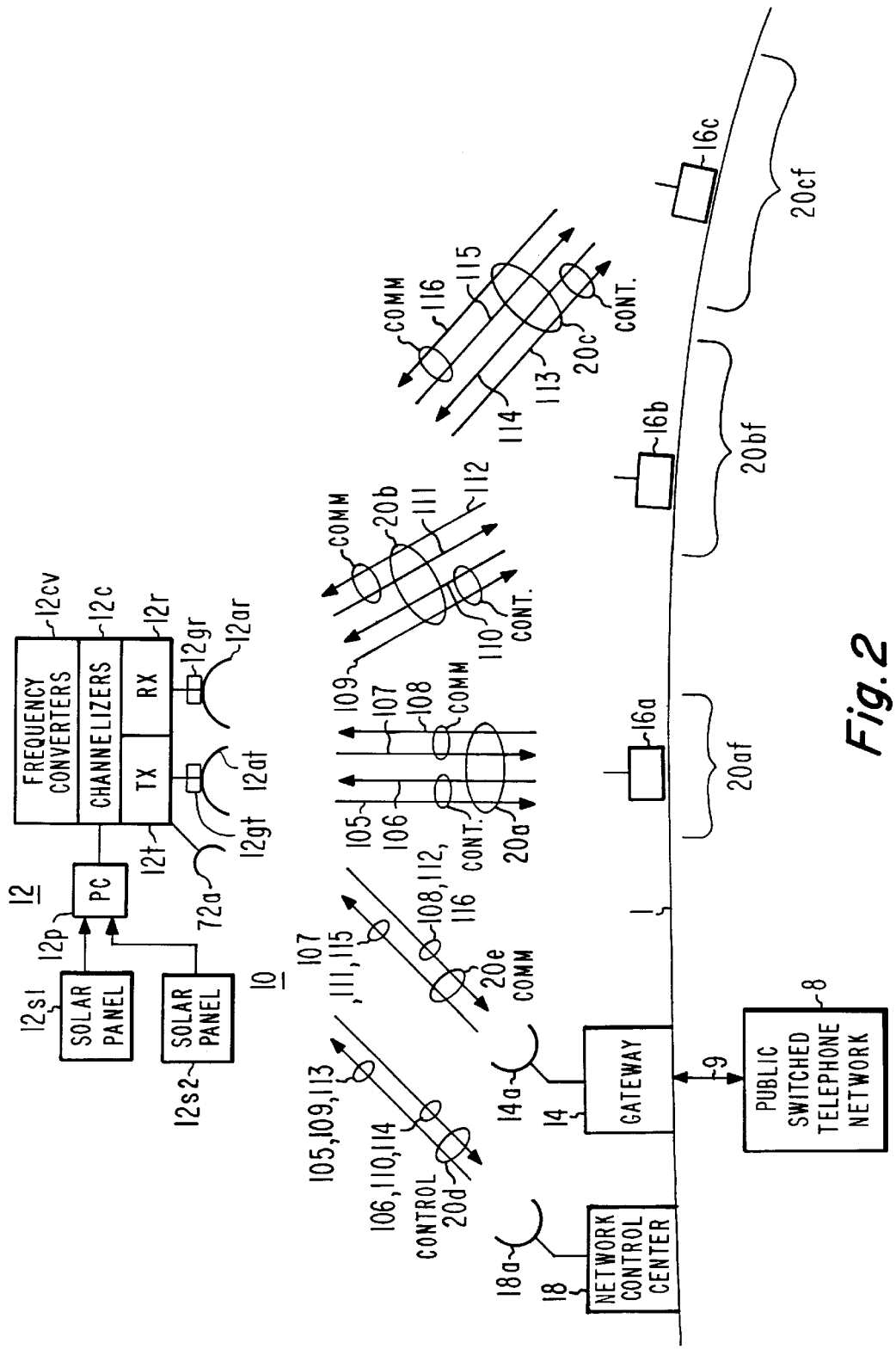
FIG. 2 is a simplified diagram similar to FIG. 1, illustrating some of the signals which flow over the various antenna beams.
Figure 3:
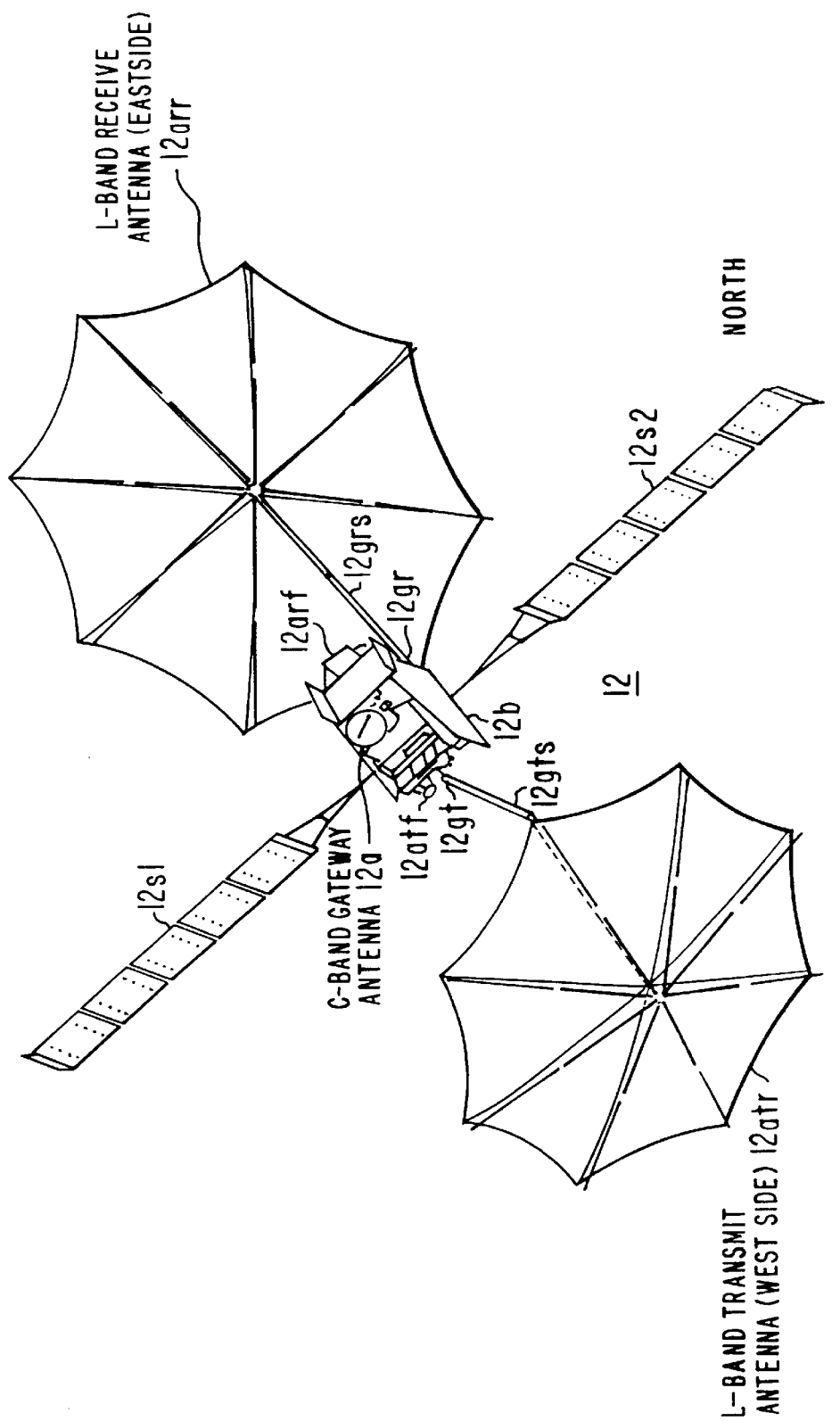
FIG. 3 is a simplified perspective or isometric view of the spacecraft of FIGS. 1 and 2 with its solar panels and antennas deployed.
Figure 4:
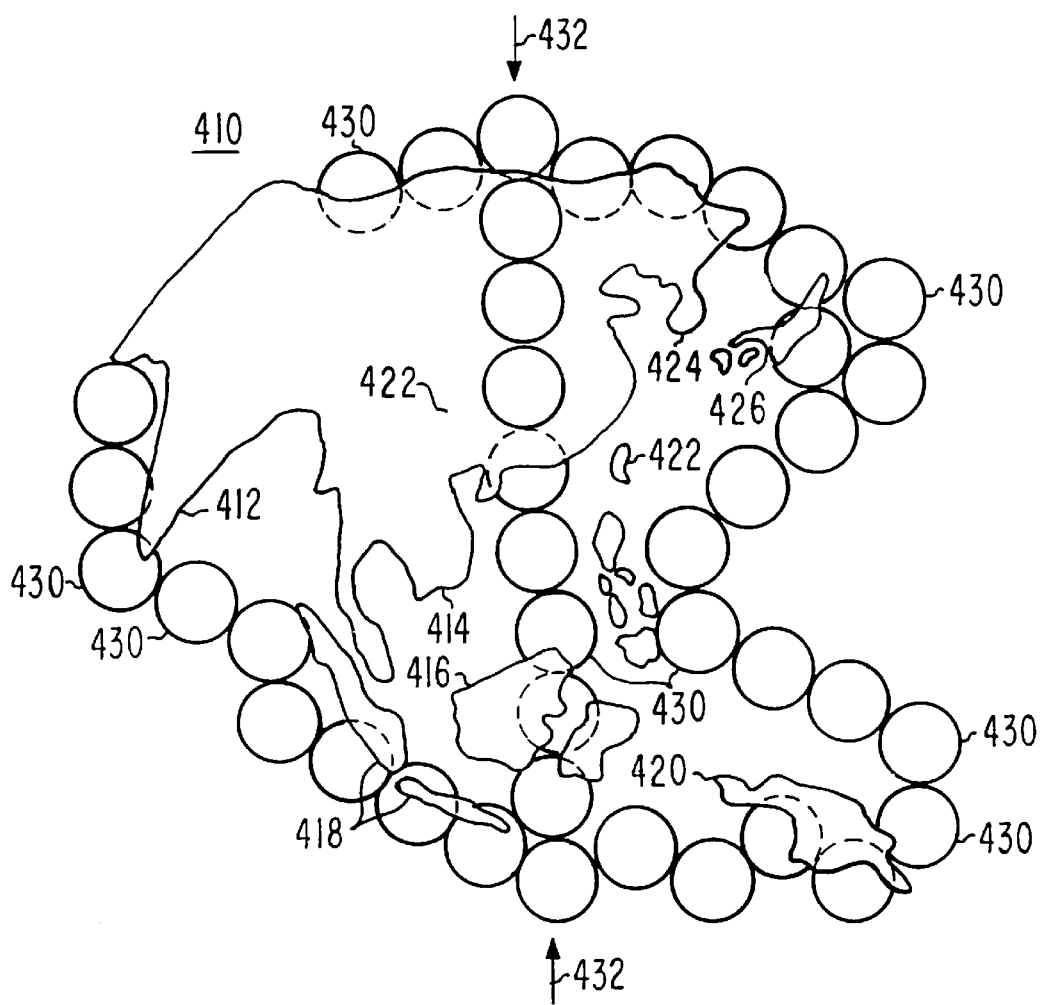
FIG. 4 is a simplified representation of the feed-horn array of one of the L-band transmit or receive antennas of the arrangement of FIG. 3, with a distorted representation of a portion of the continent Asia superposed thereon.
Figure 5:
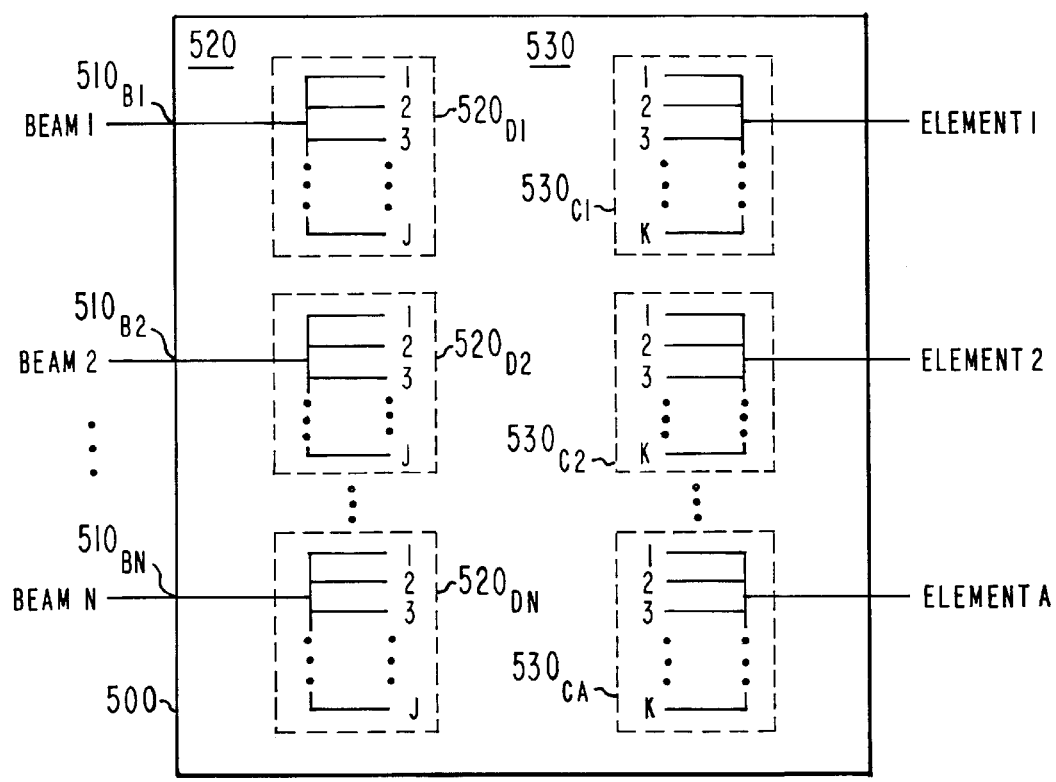
FIG. 5 is a simplified representation of a beamformer which may be used in conjunction with a feed-horn array to generate a plurality of spot beams.
Figure 6:
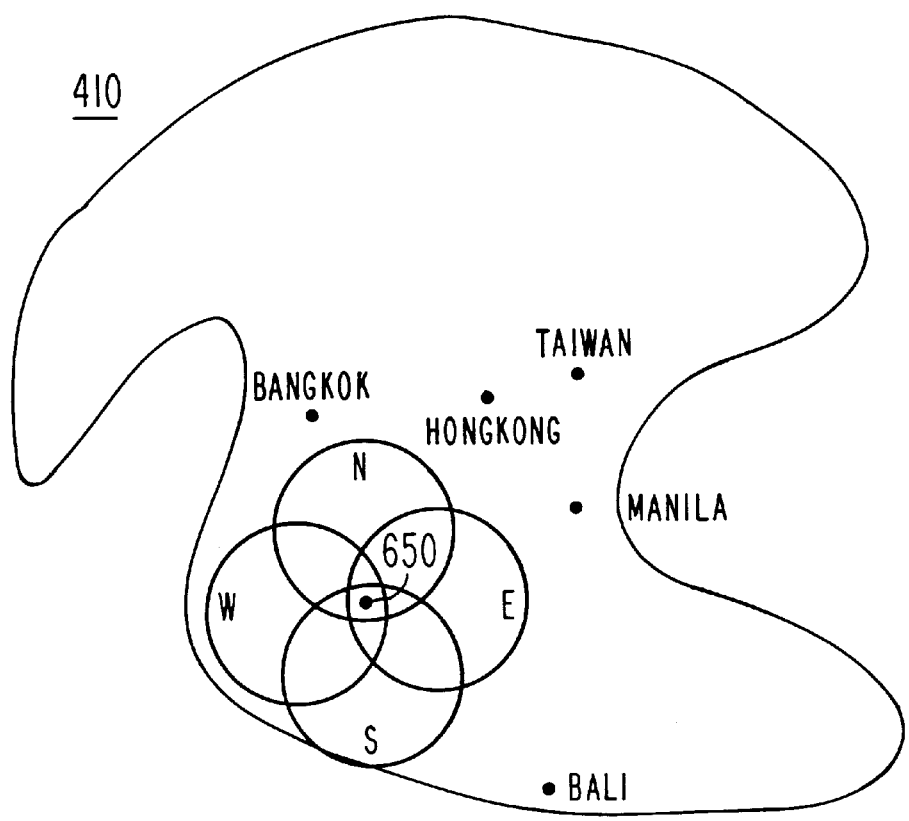
FIG. 6 illustrates a portion of the region of Asia shown in FIG. 4, showing four spot beam footprints.
Figure 7A:
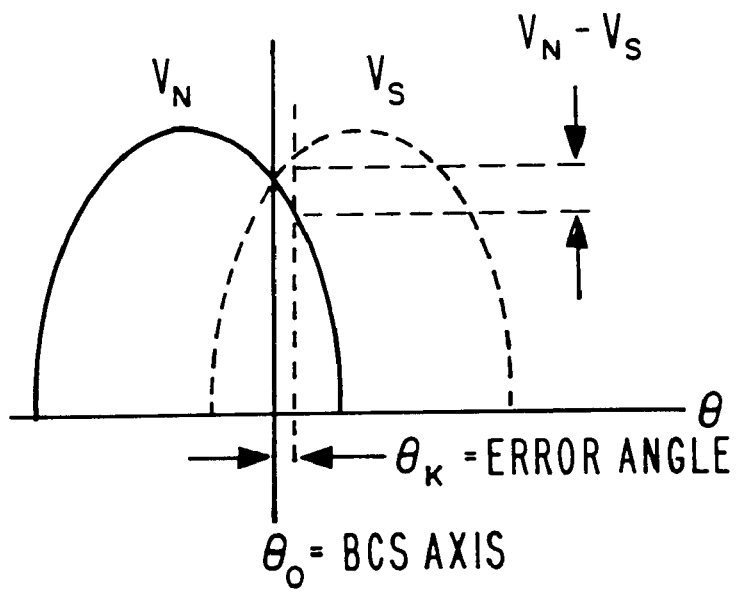
FIG. 7a illustrates two adjacent antenna beams $V_N$ and $V_S$, which overlap symmetrically about a solid vertical line at a designated angle.
Figure 7B:
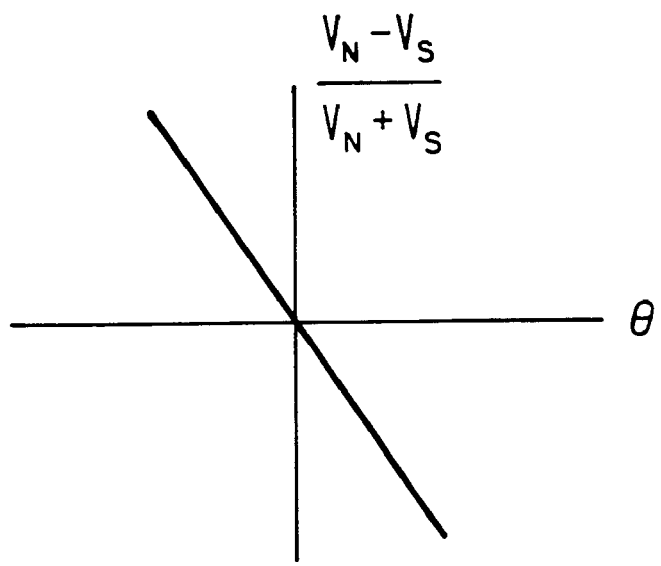
FIG. 7b is a plot of an error voltage which results from processing the difference signal $V_N$-$V_S$ by normalization, showing how a misalignment results in a linear change of the error signal relative to angular displacement.
Figure 8:
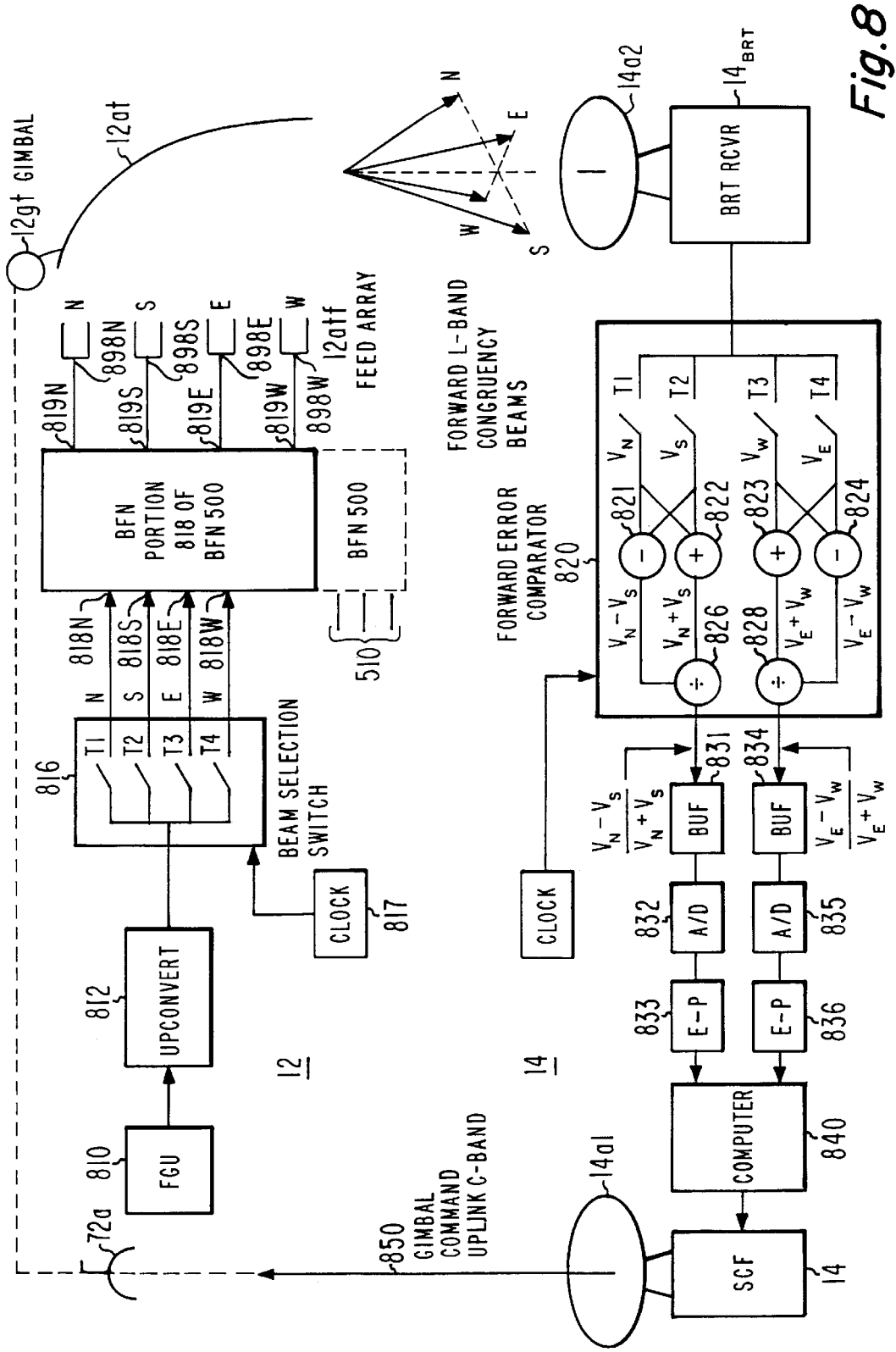
FIGS. 8 and 9 are simplified block diagrams of antenna alignment control systems associated with the system of FIGS. 1 through 7.
Figure 9:
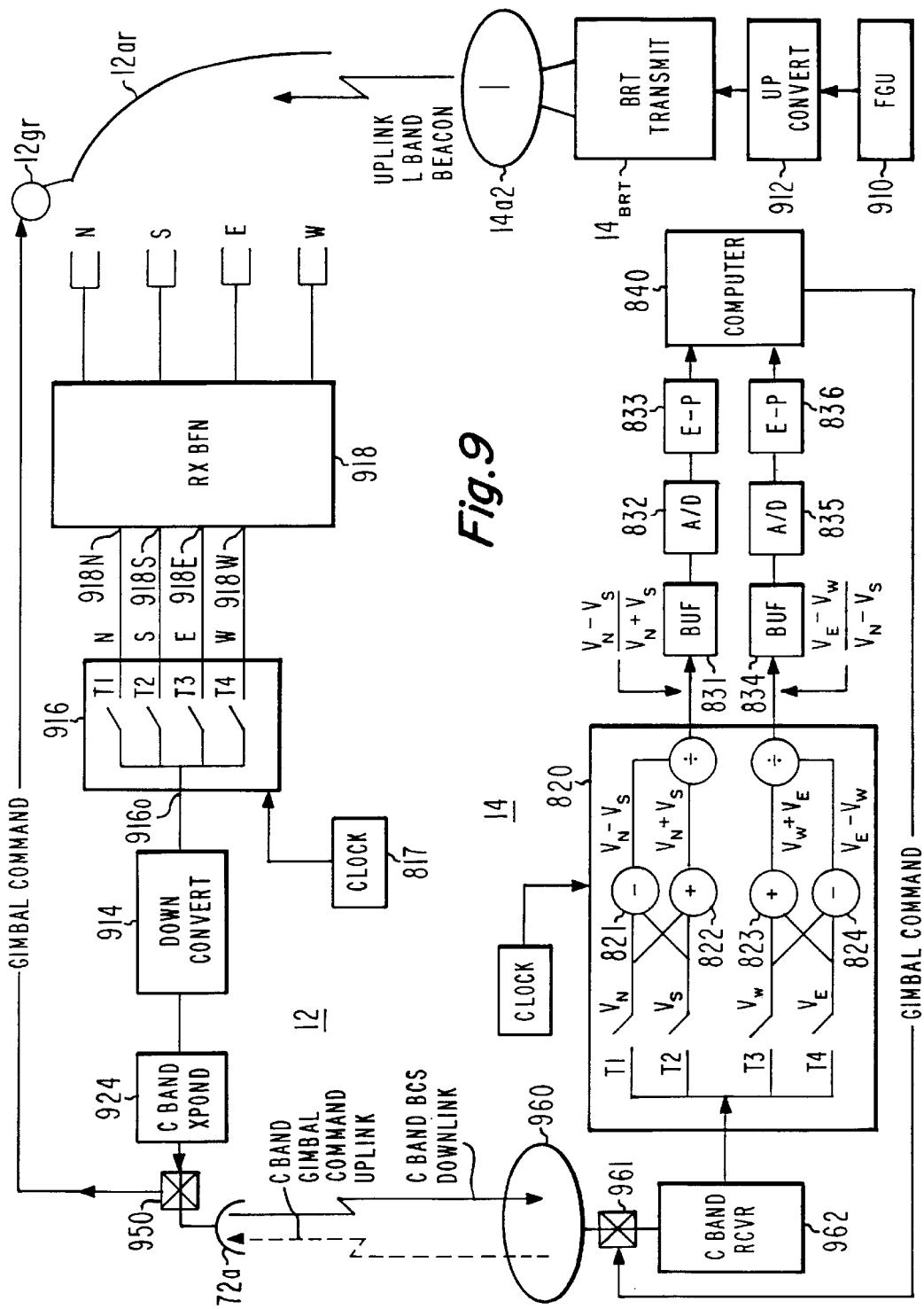
Figure 10:
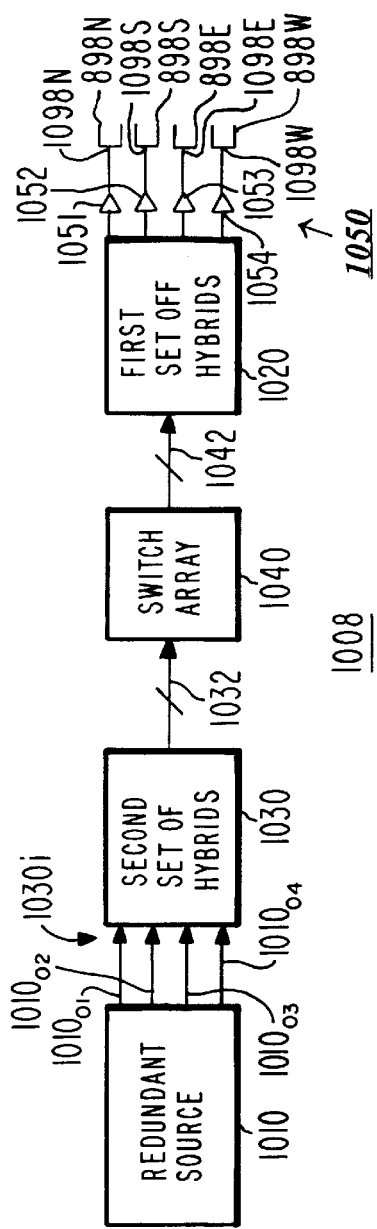
FIG. 10 is a simplified block diagram of a portion of an apparatus according to an aspect of the invention, for sequentially generating a plurality of partially-overlapping beams from a transmit antenna.

The very large capital cost of a communications spacecraft, and the large income which it is capable of producing, make it imperative that the spacecraft communication system be as reliable as possible. The beacon signal arrangement, as for example the beacon signal described in conjunction with FIG. 8, constitutes a system portion which must operate correctly in order for the communication system as a whole to remain functional, as deviation of the antenna pointing will disrupt system operation. In order to maximize the reliability of the beacon signal sequencing, the arrangement of FIG. 10 is used. In FIG. 10, an arrangement 1008 according to an aspect of the invention includes a redundant source designated as 1010, which includes four output ports designated $1010_{o1}$, $1010_{o2}$, $1010_{o3}$, and $1010_{o4}$. An upconverted beacon signal, equivalent to that produced by FGU 810 and upconverter 812 of FIG. 8, is generated at the four output ports $1010_{o1}$, $1010_{o2}$, $1010_{o3}$, and $1010_{o4}$. The redundant upconverted beacon signals at the output ports of redundant source 1010 are coupled to the input ports, designated together as 1030i, of a block 1030 representing a set of three-dB hybrids denominated as a "second" set. The second set of hybrids coacts with a first set of hybrids and a set of switches, as described below, to provide redundant switching of the redundant upconverted beacon signal. The output of block 1030 is applied by way of a set of paths 1032 to a block 1040, which represents a set of cascades of solid-state RF switches. Solid-state switches are used because, in general, they require less power to operate than do mechanical switches which perform the same function, and also because solid-state devices tend to be more reliable in operation than devices with moving parts. The output of the switch array 1040 is applied over a set of paths 1042 to a further set 1020 of hybrids, denominated a "first" set of hybrids. As illustrated in FIG. 10, block 1020 has four output paths, which lead to a set 1050 of amplifiers, which include amplifiers 1051, 1052, 1053, and 1054. The amplifiers amplify the signals produced at the output of block 1020, and apply the amplified signals to the input ports 1098N, 1098S, 1098E, and 1098W, respectively, of a set of four beamforming antenna elements 898N, 898S, 898E, 898W. In operation of the arrangement of FIG. 10, the switches of switch array 1040 are controlled in a manner such that only one of the beamforming antenna elements 898N, 898S, 898E, 898W receives the current one of the redundant upconverted beacon signals.

Figure 11:
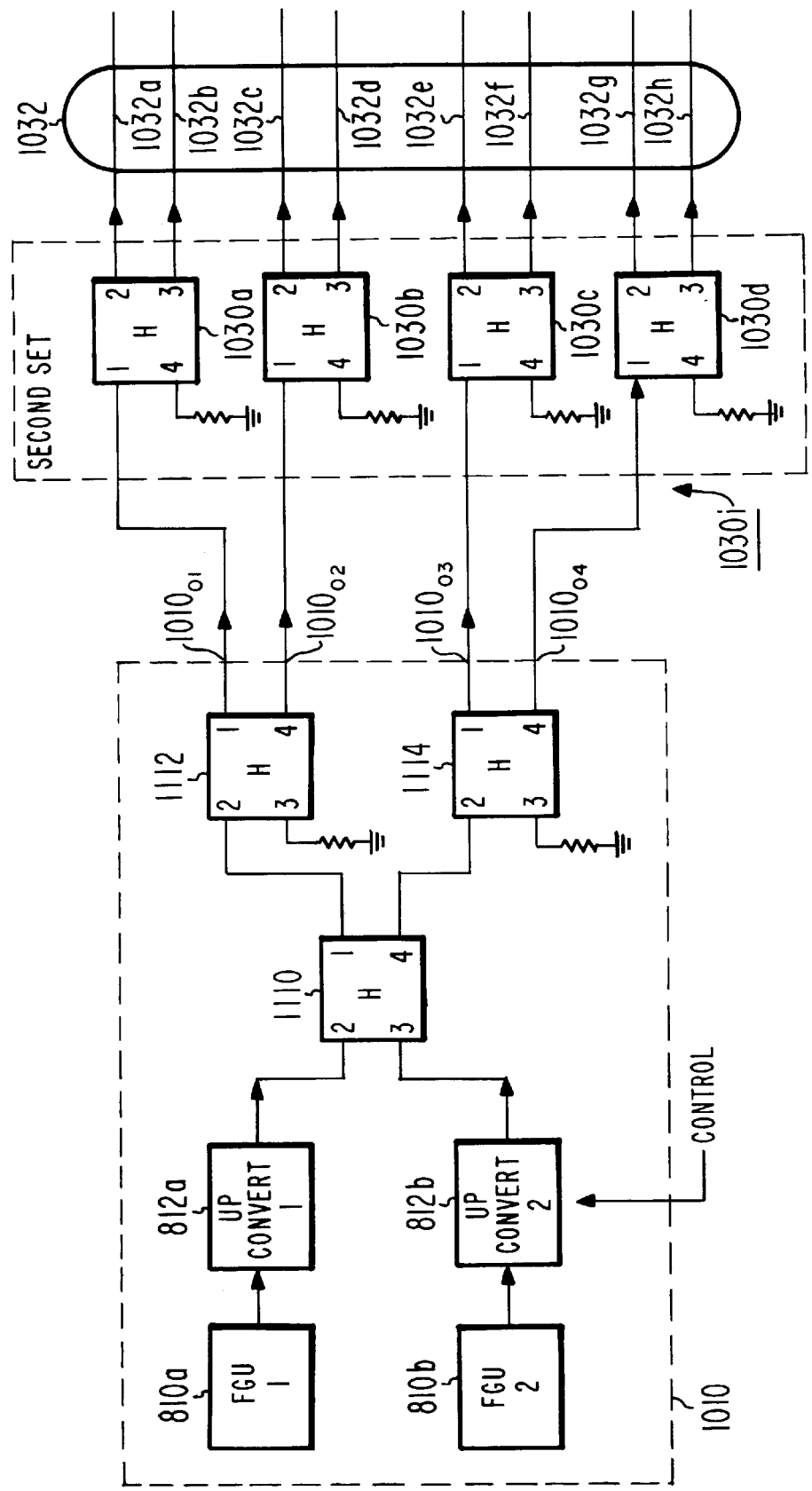

FIG. 11 illustrates details of redundant source 1010 and "second" set 1030 of hybrids. In FIG. 11, block 1010 includes a first frequency generation unit (FGU) 810a and a second FGU 810b. FGU 810a drives an upconverter 812a to produce an RF beacon signal, and FGU 810b drives a second upconverter 812b to similarly generate a second or redundant RF beacon signal. One or the other of the redundant RF beacon signal generators is energized at any one time, so that only one RF beacon signal is generated, while the redundant generator is held off-line for use if the first one should fail. The first RF beacon signal, if generated, is applied on a signal path which is coupled to the second port (port 2) of a three-dB hybrid (H) 1110, and the second RF beacon signal, if generated, is applied on a signal path which is coupled to the third port (port 3) of the three dB hybrid 1110.

As is well known to those skilled in the art; a three-dB hybrid including four ports can produce at ports 1 and 4 a signal which is the combination or sum of the signals applied to ports 2 and 3. Since only one upconverted beacon signal at a time is applied to hybrid 1110, the upconverted beacon signal appears at ports 1 and 4 of hybrid 1110 regardless of which source of the two sources is operated. Since there is but one signal involved, no phase differences need to be taken into account. Thus, redundant RF beacon signal appears at both output ports of hybrid 1110. However, operation of the illustrated system requires that the redundant beacon signal be available at four ports, and so a further set of hybrids 1112 and 1114 is used to split the signals from ports 1 and 4 of hybrid 1110. Thus, equal-amplitude versions of the redundant RF beacon signal are produced at output ports 1 and 4 of hybrids 1112 and 1114, corresponding to output ports $1010_a$, $1010_b$, $1010_c$, and $1010_d$ of redundant RF beacon source 1010.

The redundant RF beacons signals generated at output ports $1010_a$, $1010_b$, $1010_c$, and $1010_d$ of redundant RF beacon source 1010 are applied by way of a set, illustrated as being four in number, of input ports designated generally as 1030i, to the first ports (the ports designated as 1) of three-dB hybrids (H) 1030a, 1030b, 1030c, and 1030d of a set 1030 of hybrids. The fourth ports (the ports designated 4) of hybrids 1030a, 1030b, 1030c, and 1030d are terminated in an appropriate impedance, such as the characteristic impedance of the transmission lines of the system or of the hybrids. Each of hybrids 1030a, 1030b, 1030c, and 1030d acts as a power splitter or power divider, so as to produce at its output ports 2 and 3 equal-amplitude, mutually quadrature-phase versions of the signal applied to its input port 1. The two equal-amplitude versions of the currently-selected one of the redundant RF beacon signal which are generated at the output ports 2 and 3 of three-dB hybrid 1030a are applied to transmission lines or conductors 1032a and 1032b, respectively, of a signal path or bus 1032. The two equal-amplitude versions of the currently-selected one of the redundant RF beacon signal which are generated at the output ports 2 and 3 of three-dB hybrid 1030*b* are applied to transmission lines or conductors 1032*c* and 1032*d*, respectively, of signal path 1032. Similarly, the two equal-amplitude versions of the currently-selected one of the redundant RF beacon signal which are generated at output ports 2 and 3 of three-dB hybrid 1030*c* are applied to transmission lines or conductors 1032*e* and 1032*f*, respectively, of signal path 1032. For completeness, the two equal-amplitude versions of the currently-selected one of the redundant RF beacon signal which are generated at output ports 2 and 3 of three-dB hybrid 1030*d* are applied to transmission lines or conductors 1032*g* and 1032*h*, respectively, of signal path 1032. The arrangement of FIG. 11, then, is one which takes the current one of the redundant RF beacon signals from source 1010, and splits it into a plurality, which in the illustrated case is eight, of mutually identical RF beacon signals.

Figure 12:
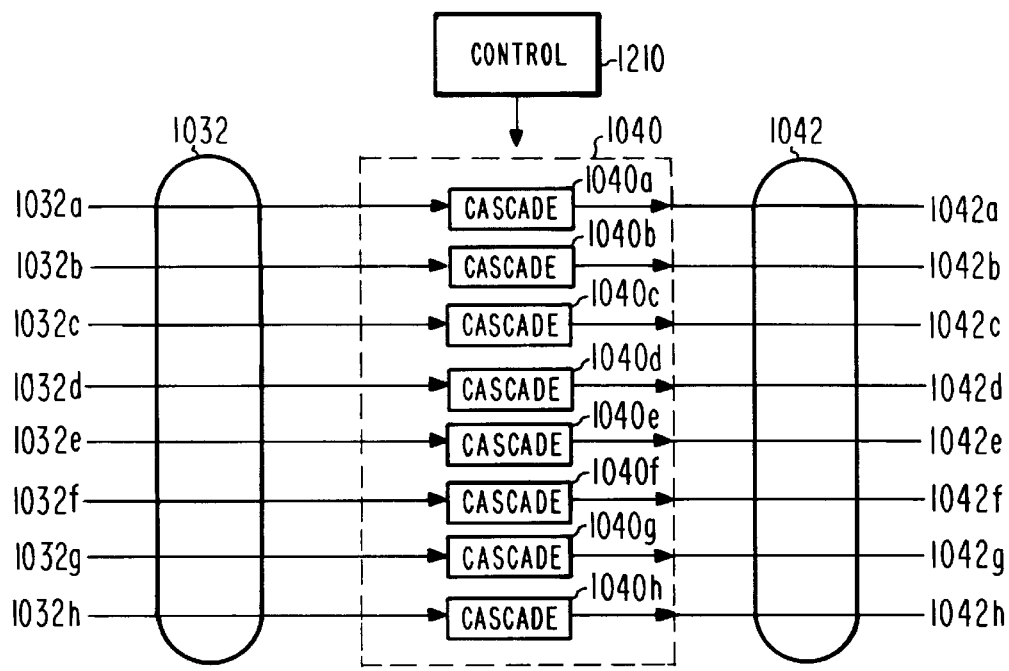

FIG. 12 illustrates details of switch arrangement 1040 of FIG. 10. In FIG. 12, the eight mutually identical versions of the RF beacon signal arrive on the various "input" signal paths of path or bus 1032, and each one is applied to a switch cascade of a set 1040 of switch cascades. More particularly, the RF beacon signals arriving by way of signal paths 1032*a* and 1032*b* are applied to switch cascades 1040*a* and 1040*b*, respectively, the RF beacon signals arriving by way of signal paths 1032*c* and 1032*d* are applied to switch cascades 1040*c* and 1040*d*, respectively, the RF beacon signals arriving by way of signal paths 1032*e* and 1032*f* are applied to switch cascades 1040*e* and 1040*f*, respectively, and the RF beacon signals arriving by way of signal paths 1032*g* and 1032*h* are applied to switch cascades 1040*g* and 1040*h*, respectively. Each switch cascade 1040*a*, 1040*b*, 1040*c*, 1040*d*, 1040*e*, 1040*f*, 1040*g*, and 1040*h* of set 1040 of switches of FIG. 12 is capable of assuming one of two states, under the control of a controller illustrated as 1210. These states are an ON or conductive state, in which signal applied from input bus 1032 is coupled to a path of an output bus 1042, and an OFF or nonconductive state, in which signal applied from bus 1032 is blocked from proceeding, and is not coupled to a path of output bus 1042. More particularly, when cascade 1040*a* is ON, signal arriving by way of path 1032*a* is coupled to a corresponding path 1042*a* of output bus 1042, and when cascade 1040*a* is OFF, signal arriving by way of input path 1032*a* is blocked from proceeding to output path 1042*a* of output bus 1042. When cascade 1040*b* is ON, signal arriving by way of path 1032*b* is coupled to a corresponding path 1042*b* of output bus 1042, and when cascade 1040*b* is OFF, signal arriving by way of input path 1032*b* is blocked from proceeding to output path 1042*b* of output bus 1042. For brevity, it is noted that all of the cascades operate in the same fashion as that described for cascades 1040*a* and 1040*b*, blocking progress of the RF beacon signal when in the OFF state, and allowing the signal to pass in the ON state.

Figure 13:
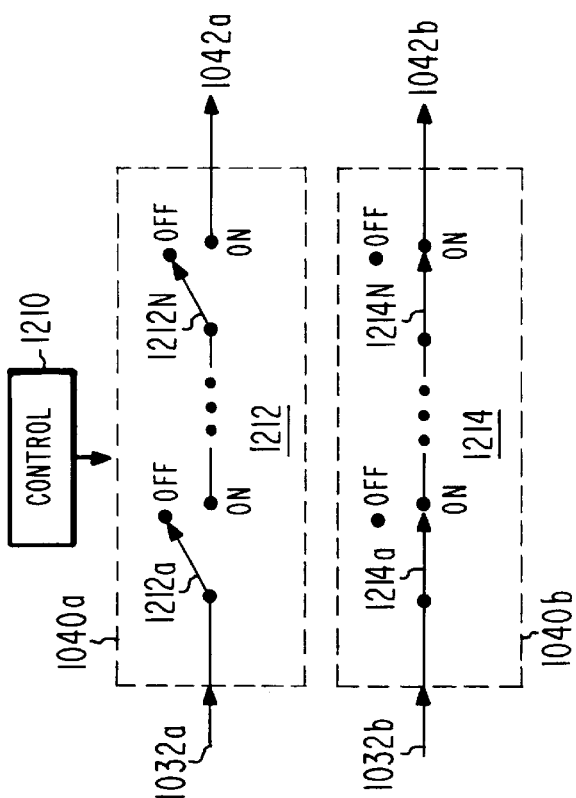
FIGS. 11, 12, 13, and 14 are simplified block diagrams of various portions of the arrangement of FIG. 10.

Each switch cascade 1040*a*, 1040*b*, 1040*c*, 1040*d*, 1040*e*, 1040*f*, 1040*g*, and 1040*h* of set 1040 of switches of FIG. 12 is a cascade of controllable solid-state switches, many types of which are known in the art, including series-connected andor parallel-connected diodes, and various transistor-based arrangements. The reason for cascading such switches is for reliability. FIG. 13 is a simplified schematic diagram illustrating details of two of the cascades, namely cascades 1040*a* and 1040*b*. In FIG. 13, cascade 1040*a* can be seen to include a plurality of series-connected switches, including switches 1212*a*, . . . 1212N, each of which is represented by a mechanical switch symbol. Those skilled in the art know that such a mechanical representation is solely for the purpose of explanation, and that in actuality each individual switch, such as switch 1212*a*, includes one or more semiconductor devices. Similarly, cascade 1214 includes a cascade of a plurality of series-connected semiconductor or solid-state switches 1214*a*, . . . , 1214N. As illustrated in FIG. 13 solely for the purpose of explanation, the switches 1212*a*, . . . , 1212N of cascade 1040*a* are in the OFF state, so that one of the redundant RF beacon signals applied by way of path 1032*a* cannot reach output path 1042*a*. Also as illustrated in FIG. 13, the switches 1214*a*, . . . , 1214N of cascade 1040*b* are in the ON state, so that the same one of the redundant RF beacon signals, applied by way of path 1032*b* reaches output path 1042*a*. It will be appreciated that controller 1210 can be programmed to control the switches in any desired manner. For example, controller 1210 could be controlled so as to never operate pairs of cascades in a manner such that one cascade is ON during those intervals in which the other cascade of the pair is OFF; it would instead, control both to the ON state simultaneously, and to the OFF state simultaneously. Each cascade pair can be identified by the fact that it receives its signals from the outputs of one hybrid of set 1030 of hybrids of FIG. 11. More particularly, the outputs of hybrid 1030*a* are applied to cascades 1040*a* and 1040*b*, and these two cascades therefore constitute a pair. The outputs of hybrid 1030*b* are applied to cascades 1040*c* and 1040*d*, and these two cascades therefore constitute a pair. Similarly, the outputs of hybrid 1030*c* are applied to cascades 1040*e* and 1040*f*, and these two cascades constitute a pair. For completeness, the outputs of hybrid 1030*d* are applied to cascades 1040*g* and 1040*h*, and these two cascades constitute a pair. If there were more hybrids, the cascades coupled to the outputs of each of those additional hybrids would be paired similarly. In a preferred control arrangement, each pair of cascades has one cascade designated as primary, and the other as secondary, and the controller 1210 is programmed to operate or switch only the primary cascade, until such time as the primary cascade fails, in which case the secondary cascade of the pair is brought on-line and operated. With the described simultaneous control of the pairs of cascades, the output of each hybrid 1030*a*, 1030*b*, 1030*c*, and 1030*d* of set 1030 of hybrids will ordinarily reach both of the output paths of set 1042 of paths when the associated cascades are in the ON condition Controller 1210 of FIGS. 12 and 13 controls each pair of cascades so that only one pair of cascades is ON at any one time, and the others pairs are OFF. Controller 1210 also controls so that the pair of cascades which is selected to be ON cycles among the available pairs, so that the RF beacon signal is applied in sequence to beamforming elements 898N, 898S, 898E, and 898W (although the ordering of the sequence is irrelevant). This allows the beacon signal to perform the location function as described in conjunction with FIG. 8.

The paired cascade arrangement of solid-state switches illustrated and described in conjunction with FIGS. 12 and 13 has the advantage of high reliability. If a single switch in either cascade fails in the ON or conductive state (that is, cannot be rendered nonconductive), the remaining switches, in their OFF state, still control the passage of the signal, and the operation of the cascade is unaltered (although the isolation of the cascade may be degraded). If one of the switches of a cascade fails in the OFF (nonconducting) state, that particular cascade is disabled, for it cannot thereafter be operated to the ON (conducting) state. However, since the cascades are paired, and they operate on two different versions of the same signal, there remains another cascade which can be operated to both the ON and OFF states to switch the signal, and the signal routed through the remaining operable cascade is divided into two portions by the following hybrid, so that the sequencing is unaltered.

Figure 14:
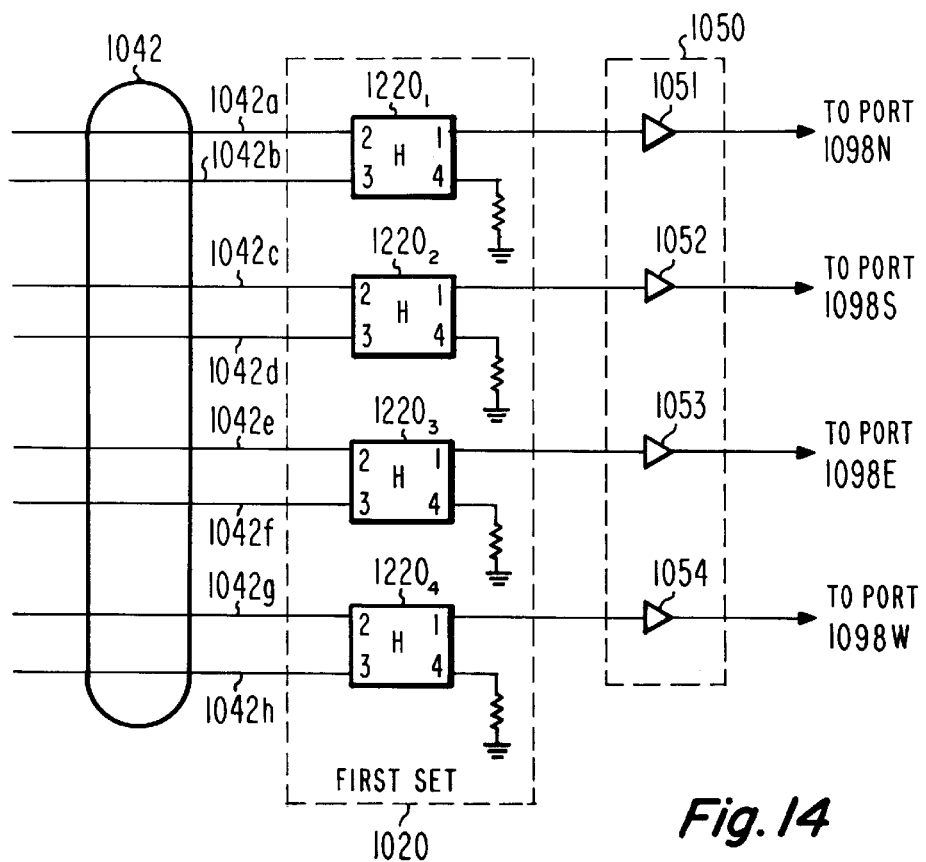

FIG. 14 illustrates details of block 1020 of FIG. 10, and its relationship to the signal routing. Under ordinary conditions, when all cascades are operating normally in FIG. 14, the selected one of the redundant RF beacon signals arrives at a particular hybrid of set 1020 by way of either (or both) paths associated with a particular pair of cascades. More particularly, when one of cascades 1040a or 1040b is ON and the other cascades are OFF, the selected RF beacon signal arrives at one of ports 2 or 3 of hybrid $1220_1$, and becomes available at output port 1 of the hybrid for application to amplifier 1051 and the North beam forming element, and when the cascades 1040a and 1040b are ON and the other cascades are OFF, the selected RF beacon signal arrives at both ports 2 and 3 of hybrid $1220_1$, and the two versions are summed (taking phase shifts into account, if necessary) to produce the signal at port 1 for application to amplifier 1051 and the North beam forming element. At the time at which the RF beacon signal passes through one or both of ON-state cascades 1040a and 1040b, the other cascades are OFF, and the RF beacon signal does not reach any other hybrid, so no other beam forming element receives beacon signal. Consequently, only the North beam is generated. Similarly, with all cascades working properly (or with at least one of the cascades of each pair operating properly), and with controller 1210 controlling at least one of the cascades 1040c and 1040d of the second pair to the ON state, and the remaining cascades to the OFF state, RF beacon signal is applied only to generate the S beam. With all cascades working properly, and with controller 1210 controlling at least one of the cascades 1040e and 1040f of the third pair to the ON state, and the remaining cascades to the OFF state, RF beacon signal is applied only to generate the E beam. Finally, with all cascades working properly, and with controller 1210 controlling the at least one of the cascades 1040g and 1040h of the fourth pair of cascades to the ON state, and the remaining cascades to the OFF state, RF beacon signal is applied only to generate the W beam.

If a switch of one cascade of FIG. 12 fails in the ON state, that cascade can still be turned OFF, as mentioned above. Consequently, the failure to the ON state of less than all of the solid-state switches of a cascade has no effect on the operation described above, and the sequencing of the beacon beams continues. If a switch of a cascade fails in the OFF state, that cascade of switches cannot thereafter be operated to the ON state, and so is disabled. However, beam sequencing can continue, since the other switch cascade of the pair continues to function, and to switch its version of the RF beacon signal to the output hybrid. For example, if cascade 1040a of FIG. 12 were to fail in the OFF state, no RF beacon signal could pass therethrough to port 2 of hybrid $1220_1$ of FIG. 14. However, its paired cascade would be switched into service and continue to be operated to the ON and OFF states by controller 1210, with the result that the RF beacon signal would still be sequenced to port 3 of hybrid $1220_1$ of FIG. 14. If only one cascade of a pair were ordinarily in service, the switchover would have no effect on the amplitude of the beacon signal. If both switches of each cascade had been in operation, the switchover to use of only one of the switch pairs would have the effect of reducing the RF beacon signal amplitude applied to by way of amplifier 1051 to antenna 898N, which would reduce the transmitted signal power, but would also allow operation to continue. Ideally, for such a situation amplifier 1051 would be provided with a gain control, so that the amplification could be increased by 3 dB in order to overcome even this minor effect.

As a result of this arrangement, the RF beacon signal leaving port 1 of a hybrid of set 1020 of hybrids is applied by way of a power amplifier to a port of one beamforming antenna element. More particularly, the signal at port 1 of hybrid $1220_1$, of FIG. 14 is applied to an amplifier 1051, and the amplified signal is made available for application to port 1098N of antenna 898N, the signal at port 1 of hybrid $1220_2$ of FIG. 14 is applied to an amplifier 1052, and the amplified signal is made available for application to port 1098S of antenna 898S, the signal at port 1 of hybrid $1220_3$ of FIG. 14 is applied to an amplifier 1053, and the amplified signal is made available for application to port 1098E of antenna 898S, and the signal at port 1 of hybrid $1220_4$ of FIG. 14 is applied to an amplifier 1054, and the amplified signal is made available for application to port 1098W of antenna 898W.

Thus, the arrangement of the invention described in conjunction with FIG. 10 has a redundant or selectable source of RF beacon signal, and the beacon signals are applied to a "second" set of hybrids, in which the selected one of the RF beacon signals is replicated, to produce, or make available, two beacon signals for each antenna element to be driven. As described in conjunction with FIGS. 10, 11, 12, and 13, hybrid set 1030 produces eight replicas (four pairs) of the selected one of the RF beacon signals for driving four beamforming elements. Each pair of the replicated RF beacon signals is applied to a pair of cascades of switches in a switch array 1040, and the switches of at least one of the pairs of cascades are operated while the other cascade of the pair is held in reserve, or the switches of each pair of cascades are operated to the same state simultaneously (either both ON or both OFF). The pairs of cascades are turned ON and OFF in timed sequence by a controller, so that the RF beacon signal is cyclically applied, in turn, to each of the beamforming elements, so as to sequentially form the four beams necessary, in one embodiment of the invention, to maintain the antenna pointed at a particular location on the Earth's surface.

FIG. 15 illustrates a receiving arrangement according to an aspect of the invention. In FIG. 15, a set 898 of receiving antennas includes 898N, 898S, 898E, and 898W antenna elements. Elements 898N, 898S, 898E, and 898W are coupled to the input ports of low-noise amplifiers 1551, 1552, 1553, and 1554, respectively, of a set 1550 of amplifiers. The amplified signals from amplifier set 1550 are applied to a block 1520, representing a first set of hybrids, which form the received and amplified signals into redundant pairs. The redundant pairs of signals are applied to a switch array illustrated as a block 1540. The switch array of block 1540 includes a plurality of cascades, which are controlled to sequence the beams produced by the antenna elements of antenna 898. The sequenced received signals are applied over a set 1542 of signal paths to a second set of hybrids, illustrated as a block 1530. Block 1530 receives the four redundant received beacon signals, and converts them into signals on four separate paths, for application to input ports $1510_{i1}$, $1510_{i2}$, $1510_{i3}$, and $1510_{i4}$ of a redundant signal sink illustrated as a block 1510. The sink 1510 may include redundant receivers andor downconverters. Those skilled in the art will recognize the arrangement of FIG. 15 as being the receive version of the arrangement of FIG. 10.

For definiteness, FIG. 16 illustrates details of the arrangement of FIG. 15. In FIG. 16, low-noise amplifiers 1551, 1552, 1553, and 1554 apply their amplified signals to input ports 1 of hybrids (H) $1520_1$, $1520_2$, $1520_3$, and $1520_4$, respectively, of first hybrid set 1520. Each hybrid $1520_1$, $1520_2$, $1520_3$, and $1520_4$ makes its own received signal redundant, by hybrid division into two portions, each on one signal path. The redundant received beacon signals from hybrid $1520_1$ (originating from antenna element 898N) are applied to switch cascades 1540a and 1540b of switch array 1540, the redundant received beacon signals from hybrid $1520_2$ (originating from antenna element 898S) are applied to switch cascades 1540c and 1540d of switch array 1540, the redundant received beacon signals from hybrid $1520_3$ (originating from antenna element 898E) are applied to switch cascades 1540e and 1540f of switch array 1540, and the redundant received beacon signals from hybrid $1520_4$ (originating from antenna element 898E) are applied to switch cascades 1540g and 1540h of switch array 1540. As mentioned, the switch cascades of array 1540 are controlled, with the control being provided by a controller designated 1610, which may be identical to controller 1210 of FIG. 12, and may be operated in any of the modes described therewith.

In the arrangement of FIG. 16, the redundant beacon signals originating from antenna 898N are sequenced by cascades 1540a and 1540b, and applied over signal path(s) 1542a (and 1542b, if appropriate), respectively, to input ports 2 and 3 of a hybrid 1530a of set 1530. Similarly, the redundant beacon signals originating from antenna 898S are sequenced by cascades 1540c and 1540d, and applied over signal paths 1542d and 1542d, respectively, to input ports 2 and 3 of a hybrid 1530b of set 1530, the redundant beacon signals originating from antenna 898E are sequenced by cascades 1540e and 1540f, and applied over signal paths 1542e and 1542f, respectively, to input ports 2 and 3 of a hybrid 1530c of set 1530, and the redundant beacon signals originating from antenna 898W are sequenced by cascades 1540g and 1540h, and applied over signal paths 1542g and 1542h, respectively, to input ports 2 and 3 of a hybrid 1530d of set 1530. The hybrids of second set 1530 combine the two redundant beacon signals applied to them, and produce at their output ports 1 a signal associated with one of the antenna elements. More particularly, the signal originating from antenna element 898N and amplified by amplifier 1551, as switched by the redundant switch array, is applied from port 1 of hybrid 1530a to input port $1510_{i1}$, of redundant sink 1510, the signal originating from antenna element 898S and amplified by amplifier 1552, as switched by the redundant switch array, is applied from port 1 of hybrid 1530b to input port $1510_{i2}$ of redundant sink 1510, the signal originating from antenna element 898E and amplified by amplifier 1553, as switched by the redundant switch array, is applied from port 1 of hybrid 1530c to input port $1510_{i3}$ of redundant sink 1510, and the signal originating from antenna element 898W and amplified by amplifier 1554, as switched by the redundant switch array, is applied from port 1 of hybrid 1530d to input port $1510_{i4}$ of redundant sink 1510.

As illustrated in FIG. 16, redundant sink block 1510 includes three hybrids, namely hybrids 1110, 1112, and 1114, which are identical to those of FIG. 11, which coact to combine the sequenced beacon signals applied to four input ports $1510_{i1}$, $1510_{i2}$, $1510_{i3}$, and $1510_{i4}$ into two paths, connected to ports 2 and 3 of hybrid 1110. The signals on these two paths constitute redundant versions of the sequenced beacon signals arriving at the antenna elements of antenna 898. The two signals from hybrid 1110 are applied to redundant receivers. In the specific arrangement of FIG. 16, a first of the receivers includes a downconverter 1612a coupled to a receiver (RX) 1610a, and the second of the receivers includes a downconverter 1612b coupled to a receiver (RX) 1610b. In operation of the arrangement of FIGS. 15 and 16, the beacon transmitter on the spacecraft transmits continuously. Each of the four elements of the receiving antenna 898 has its beam directed somewhat away from the line-of-sight between the ground station and the spacecraft. The sequencing of the signals results in a change in amplitude, phase, or both between N/S and E/W antenna element pairs if the pairs are not symmetrically disposed about the line-of-sight. This asymmetry may be used to correct the alignment.

Other embodiments of the invention will be apparent to those skilled in the art. For example, while serially-connected switches have been illustrated in each cascade of switches, parallel-connected switches may be used, or an intermixture of serial- and parallel-connected switches.

Thus, an electromagnetic beam selection arrangement (1008, 1508) according to an aspect of the invention includes a first plurality (four) of beamforming antenna elements (898N, 898S, 898E, and 898W), each having a port (1098N, 1098S, 1098E, and 1098W). Each of these beamforming elements (898N, 898S, 898E, and 898W) may be a single radiating element of an array, or each one may be a subarray of radiating elements, interconnected by an appropriate beamformer or beamformer portion. The arrangement (1008, 1508) includes a first set (1020, 1520) of hybrids, including a plurality, equal to the first plurality (four), of electrically identical three-dB hybrids ($1220_1$, $1220_2$, $1220_3$, $1220_4$; $1520_1$, $1520_2$, $1520_3$, $1520_4$). Each of the three-dB hybrids ($1220_1$, $1220_2$, $1220_3$, $1220_4$; $1520_1$, $1520_2$, $1520_3$, $1520_4$) of the first set (1020, 1520) of three-dB hybrids includes at least first (1), second (2), third (3), and fourth (4) ports, and each of the three-dB hybrids provides transmission between the first port (1) and the second (2) and third (3) ports with a relative amplitude of −3 dB, and possibly with quadrature phase between the signal appearing at the second (2) and third (3) ports (so long as the fourth port (4) is terminated in the appropriate impedance). The first ports (ports 1) of each of the three-dB hybrids ($1220_1$, $1220_2$, $1220_3$, $1220_4$; $1520_1$, $1520_2$, $1520_3$, $1520_4$) of the first set (1020, 1520) of three-dB hybrids is coupled by way of paths (1050; 1550) including amplifiers (1051, 1052, 1053, 1054; 1551, 1552, 1553, 1554) to the ports (1098N, 1098S, 1098E, and 1098W) of the beamforming elements (898N, 898S, 898E, and 898W), and the fourth ports (ports 4) of the hybrids of the first set are terminated in the appropriate impedance. The arrangement (1008, 1508) also includes a second set (1030, 1530) of three-dB hybrids. The second set (1030, 1530) includes a plurality, equal to the first plurality (four), of three-dB hybrids (1030a, 1030b, 1030c, 1030d; 1530a, 1530b, 1530c, 1530d). Each of the three dB hybrids (1030a, 1030b, 1030c, 1030d, 1530a, 1530b, 1530c, 1530d) of the second plurality (1030, 1530) of three-dB hybrids is electrically identical to a three-dB hybrid of the first set. The fourth ports (ports 4) of each of the three-dB hybrids (1030a, 1030b, 1030c, 1030d, 1530a, 1530b, 1530c, 1530d) of the second set (1030, 1530) are terminated in the appropriate impedance. A redundant one of a source (1010) and sink (1510) of signal is also provided in the arrangement (1008, 1508). The redundant source (1010) or redundant sink (1510) includes a plurality of ports ($1010_{o1}$, $1010_{o2}$, $1010_{o3}$, $1010_{o4}$; $1510_{i1}$, $1510_{i2}$, $1510_{i3}$, $1510_{i4}$), where the plurality is equal to the first plurality (four). Each of the ports ($1010_{o1}$, $1010_{o2}$, $1010_{o3}$, $1010_{o4}$; $1510_{i1}$, $1510_{i2}$, $1510_{i3}$, $1510_{i4}$) of the redundant source (1010) of signal or redundant sink (1510) of signal is coupled to a first port of one of the hybrids (1030a, 1030b, 1030c, 1030d, 1530a, 1530b, 1530c, 1530d) of the second (1030, 1530) set of hybrids, and not to other ports of the hybrids of the second set of hybrids. A set (1040; 1540) of solid-state RF switch cascades (1040a, 1040b, 1040c, 1040d, 1040e, 1040f, 1040g, 1040h; 1540a, 1540b, 1540c, 1540d, 1540e, 1540f, 1540g, 1540h) is also provided. Each of the switch cascades (1040a, 1040b, 1040c, 1040d, 1040e, 1040f, 1040g, 1040h; 1540a, 1540b, 1540c, 1540d, 1540e, 1540f, 1540g, 1540h) includes a cascade of at least two solid-state switches ($1212_a$, ..., $1212_N$; $1214_a$, ..., $1214_N$), and each of the cascades (1040a, 1040b, 1040c, 1040d, 1040e, 1040f, 1040g, 1040h; 1540a, 1540b, 1540c, 1540d, 1540e, 1540f, 1540g, 1540h) of switches is electrically coupled between one of (a) a second port (port 2) of a hybrid ($1220_1$, $1220_2$, $1220_3$, $1220_4$; $1520_1$, $1520_2$, $1520_3$, $1520_4$) of the first set (1020, 1520) of hybrids and a second port (port 2) of a corresponding hybrid of the second set (1030, 1530) of hybrids and (b) a third port (port 3) of a hybrid of the first set (1020, 1520) of hybrids and a third port (port 3) of a corresponding hybrid of the second set (1030, 1530) of hybrids. As a result of these connections, or whereby, a pair of the cascades of the set (1040, 1540) of cascades connects each three-dB hybrid of the first set (1020, 1520) of hybrids to a corresponding one of the three-dB hybrids of the second set (1030, 1530) of hybrids. The arrangement (1008, 1508) also includes a controller (1210) coupled to the switches (such as switches $1212_a$, ..., $1212_N$; $1214_a$, ..., $1214_N$) of the set (1240) of solid-state switch cascades. According to a preferred control, the controller (1210) is coupled to the switches ($1212_a$, ..., $1212_N$; $1214_a$, ..., $1214_N$) of the set (1040) of solid-state switch cascades, for controlling the switches ($1212_a$, ..., $1212_N$; $1214_a$, ..., $1214_N$) to accomplish two functions, (a) and (b). The first or (a) function is to operate at least some of the switches ($1212_a$, ..., $1212_N$; $1214_a$, ..., $1214_N$) of each cascade always to the same state, as for example by operating all serially coupled switches ($1212_a$, ..., $1212_N$; $1214_a$, ..., $1214_N$) of a cascade ON or OFF together. If there are interleaved series and parallel switches, for any particular coupling condition of the cascade, each of the series switches would be set to conduct, and the parallel switches to not conduct, or vice versa. The second or (b) function is to operate the switches ($1212_a$, ..., $1212_N$; $1214_a$, ..., $1214_N$) of the pair-sets of solid-state switch cascades (1040) so as to cycle coupling among sets of cascades (1040), so that the beacon signal is sequenced to the beamforming antenna elements. More particularly, the (b) function is to operate the switches ($1212_a$, ..., $1212_N$; $1214_a$, ..., $1214_N$) of at least one cascade, of that particular pair of cascades (1040a, 1040b, for example) which couple together a selected hybrid of the first set of hybrids with a corresponding hybrid of the second set of hybrids, to a state which provides coupling between the selected hybrid and the corresponding hybrid by way of the at least one cascade of the selected pair of cascades. At the same time, or simultaneously, at least some of the switches ($1212a$, ..., $1212_N$; $1214_a$, ..., $1214_N$) of those pairs of cascades (1040a, 1040b, 1040c, 1040d, 1040e, 1040f, 1040g, 1040h; 1540a, 1540b, 1540c, 1540d, 1540e, 1540f, 1540g, 1540h) which couple together non-selected ones of the first set of hybrids with corresponding ones of the hybrids of the second set of hybrids are controlled or operated to states which provide reduced coupling. In this context, "coupling" and "reduced coupling" correspond to the ON and OFF states, respectively, of a cascade, in which the ON state may undesirably exhibit some loss, and the OFF state may undesirably exhibit some leakage. The second or (b) function further includes the sequential selection, in turn, of each of the hybrids of the first set of hybrids. As a result of this control function applied to the structure, each of the beamforming antenna elements is sequentially selected and is coupled by at least one switch path of redundant switch paths to the redundant one of the source and sink. The controller (1210) controls the switches for (a) operating the switches of each cascade always to the same state (all ON or all OFF), and (b) closing the switches of that pair of cascades which couple together a selected hybrid of the first set (1020, 1520) of hybrids with a corresponding hybrid of the second set (1030, 1530) of hybrids while, or simultaneously with, opening the switches of those pairs of cascades which couple together non-selected ones of the first set (1020, 1520) of hybrids with corresponding ones of the hybrids of the second set (1030, 1530) of hybrids. The controller also controls the switches for sequentially selecting, in turn, each of the hybrids of the first set (1020, 1520) of hybrids, whereby each of the beamforming antenna elements (898N, 898S, 898E, and 898W) is sequentially selected and is coupled by redundant switch paths to the redundant one of the source (1010) and sink (1510). In a particularly advantageous embodiment of the invention, the plurality is four.

What is claim is:

1. An electromagnetic beam selection arrangement, said arrangement comprising:
   a first plurality of beamforming antenna elements, each having a port;
   a first set of hybrids including a second plurality, equal in number to said first plurality, of three-dB hybrids, each of said three-db hybrids of said first set of hybrids having first, second, third, and fourth ports, each of said three-dB hybrids providing transmission between said first port and said second and third ports with a relative amplitude of −3 dB and with quadrature phase between the signals appearing at said second and third ports, so long as said fourth port is terminated in the appropriate impedance, said first ports of each of said three-dB hybrids of said first set of hybrids being coupled by way of amplifiers to said ports of said beamforming elements, and said fourth ports of said hybrids of said first set of hybrids being terminated in said appropriate impedance;
   a second set of hybrids, said second set of hybrids including a third plurality, equal in number to said first plurality, of three-dB hybrids, each of which is electrically identical to a three-dB hybrid of said first set of hybrids, with said fourth ports of each of said three-dB hybrids of said second set of hybrids being terminated in said appropriate impedance;
   a redundant one of a source and sink of signal, said redundant one of a source and sink of signal including a fourth plurality of ports, said fourth plurality being equal in number to said first plurality, each of said ports of said redundant one of a source and sink of signal being coupled to a first port of one of said three-db hybrids of said second set of hybrids, and not to the ports of others of said three-db hybrids of said second set of hybrids;
   a set of RF switch cascades, each of said switch cascades including a cascade of at least two solid-state switches, each of said switch cascades being coupled between one of (a) a second port of a three-db hybrid of said first set of hybrids and a second port of a corresponding three-db hybrid of said second set of hybrids and (b) a third port of a three-db hybrid of said first set of hybrids and a third port of a corresponding three-db hybrid of said second set of hybrids, whereby a pair of said switch cascades connects each three-dB hybrid of said first set of hybrids to a corresponding one of said three-dB hybrids of said second set of hybrids; and a controller coupled to said solid-state switches of said set of switch cascades, said controller controlling said solid-state switches for (a) operating at least some of the solid-state switches of each switch cascade always to the same state, and (b) operating the solid-state switches of at least one switch cascade of that pair of switch cascades which couple together a selected three-db hybrid of said first set of hybrids with a corresponding three-db hybrid of said second set of hybrids to a state which provides coupling between said selected three-db hybrid and said corresponding three-db hybrid by way of said at least one switch cascade, while operating at least some of the solid-state switches of those pairs of switch cascades which couple together non-selected three-db hybrids of said first set of hybrids with corresponding ones of said three-db hybrids of said second set of hybrids to states which provide reduced coupling, and for sequentially selecting, in turn, each of said three-db hybrids of said first set of hybrids, whereby each of said beamforming antenna elements is sequentially selected and is coupled by redundant switch paths to said redundant one of said source and sink.

2. An arrangement according to claim 1, wherein said solid-state switches of each of said switch cascades are serially coupled to thereby provide a particular level of coupling through said switch cascades when its respective solid-state switches are in the ON state, and a lesser amount of said coupling when its solid-state switches are in the OFF state.

3. An arrangement according to claim 2, wherein said plurality is four.

4. An arrangement according to claim 2, wherein each of said switch cascades includes a cascade of at least two serially-coupled solid-state switches.

5. An electromagnetic beam selection arrangement, said arrangement comprising:

a first plurality of beamforming antenna elements, each having a port;

a first set of hybrids including a second plurality, equal in number to said first plurality, of three-dB hybrids, each of said three-db hybrids having first, second, third, and fourth ports, each of said three-dB hybrids providing transmission between said first port and said second and third ports with a relative amplitude of −3 dB and with quadrature phase between the signal appearing at said second and third ports, so long as said fourth port is terminated in the appropriate impedance, said first ports of each of said three-dB hybrids of said first set of hybrids being coupled by way of amplifiers to said ports of said beamforming antenna elements, and said fourth ports of said three-db hybrids of said first set of hybrids being terminated in said appropriate impedance;

a second set of three-dB hybrids, said second set including a third plurality, equal in number to said first plurality, of three-dB hybrids, each of which three-db hybrids of said second set is electrically identical to a three-dB hybrid of said first set of hybrids, with said fourth ports of each of said three-dB hybrids of said second set of hybrids being terminated in said appropriate impedance;

a redundant one of a source and sink of signal, said redundant one of a source and sink of signal including a fourth plurality of ports, said fourth plurality being equal in number to said first plurality, each of said ports of said redundant one of a source and sink of signal being coupled to a first port of one of said three-db hybrids of said second set of hybrids, and not to the ports of others of said three-db hybrids of said second set of hybrids;

a set of solid-state RF switch cascades, each of said switch cascades including a cascade of at least two solid-state switches, each of said switch cascades being coupled between one of (a) a second port of a three-db hybrid of said first set of hybrids and a second port of a corresponding three-db hybrid of said second set of hybrids and (b) a third port of a three-db hybrid of said first set of hybrids and a third port of a corresponding three-db hybrid of said second set of hybrids, whereby a pair of said switch cascades connects each three-dB hybrid of said first set of hybrids to a corresponding one of said three-dB hybrids of said second set of hybrids; and a controller coupled to said solid-state switches of said set of switch cascades, said controller controlling said solid-state switches for (a) operating the solid-state switches of each switch cascade always to the same state, and (b) closing the solid-state switches of that pair of switch cascades which couple together a selected three-db hybrid of said first set of hybrids with a corresponding three-db hybrid of said second set of hybrids while opening the solid-state switches of those pairs of switch cascades which couple together non-selected three-db hybrids of said first set of hybrids with corresponding ones of said three-db hybrids of said second set of hybrids, and for sequentially selecting, in turn, each of said three-db hybrids of said first set of hybrids, whereby each of said beamforming antenna elements is sequentially selected and is coupled by redundant switch paths to said redundant one of said source and sink.

6. An arrangement according to claim 5, wherein said plurality is four.

7. An arrangement according to claim 6, wherein each of said switch cascades includes a cascade of at least two serially-coupled solid-state switches.

* * * * *